United States Patent
Tian

(10) Patent No.: US 10,126,717 B2
(45) Date of Patent: Nov. 13, 2018

(54) MULTIPLE INDEPENDENT VARIABLE CURVE FITTING METHOD

(71) Applicant: LINESTREAM TECHNOLOGIES, Cleveland, OH (US)

(72) Inventor: Gang Tian, Westlake, OH (US)

(73) Assignee: LINESTREAM TECHNOLOGIES, Cleveland, OH (US)

( * ) Notice: Subject to any disclaimer, the term of this patent is extended or adjusted under 35 U.S.C. 154(b) by 70 days.

(21) Appl. No.: 15/276,937

(22) Filed: Sep. 27, 2016

(65) Prior Publication Data

US 2018/0088538 A1 Mar. 29, 2018

(51) Int. Cl.
G05B 11/01 (2006.01)
G05B 23/02 (2006.01)

(52) U.S. Cl.
CPC .......... *G05B 11/01* (2013.01); *G05B 23/0297* (2013.01)

(58) Field of Classification Search
CPC ........ G05B 11/01; G05B 11/00; G05B 15/00; G05B 19/00; G05B 21/00; G05B 23/0297; G05B 2219/00
See application file for complete search history.

(56) References Cited

U.S. PATENT DOCUMENTS

| | | | |
|---|---|---|---|
| 8,041,436 B2 | 10/2011 | Gao | |
| 8,060,340 B2 | 11/2011 | Gao et al. | |
| 8,467,888 B2 | 6/2013 | Gahinet et al. | |
| 8,710,777 B2 | 4/2014 | Tian | |
| 9,041,337 B2 | 5/2015 | Tian | |
| 2003/0199997 A1 | 10/2003 | Gao | |
| 2004/0059518 A1 | 3/2004 | Rothschild | |
| 2014/0379102 A1 | 12/2014 | Tian et al. | |
| 2016/0033944 A1 | 2/2016 | El-Shaer et al. | |

(Continued)

OTHER PUBLICATIONS

Tian et al., Frequency Response Analysis of Active Disturbance Rejection Based Control System, Oct. 1-3, 2007, 16th IEEE International Conference on Control Applications, Part of IEEE Multi-conference on Systems and Control, Singapore, pp. 1595-1599.*

(Continued)

*Primary Examiner* — Toan Le
(74) *Attorney, Agent, or Firm* — Amin, Turocy & Watson LLP

(57) ABSTRACT

A curve fitting system implements a multi-level curve fitting approach to obtain a mapping between variables of interest. According to this approach, the system establishes first curve fitting relationships between a first variable of interest and a second variable of interest for sets of values of the independent variables. Then, second curve fitting relationships are established between the coefficients of the previously established curve fitting relationships and one of the independent variables for multiple value sets of the remaining independent variables. These recursive curve fitting operations are repeated until curve fitting relationships are obtained for all of the independent variables. The system then generates mapping data based on the curve fitting relationships, where the mapping data defines a mapping from the first independent variable to the second independent variable. This technique can be applied to determine functional relationships between tuning parameters and performance parameters of a motion system.

20 Claims, 23 Drawing Sheets

(56) References Cited

U.S. PATENT DOCUMENTS

| | | |
|---|---|---|
| 2016/0094628 A1 | 3/2016 | Husain et al. |
| 2016/0209816 A1 | 7/2016 | Neundorfer |
| 2016/0276966 A1 | 9/2016 | Tian |

OTHER PUBLICATIONS

Tian et al., Benchmark Tests of Active Disturbance Rejection Control on an Industrial Motion Control Platform, Jun. 10-12, 2009, 2009 American Control Conference, St. Louis, MO, pp. 5552-5557.*

The MathWorks, Inc., Curve Fitting Toolbox User's Guide, R2016b, 2001-2016.

* cited by examiner

MULTIPLE INDEPENDENT VARIABLE CURVE FITTING METHOD

TECHNICAL FIELD

This disclosure generally relates to motion control, and, more specifically, to analysis and design of motion control systems.

BACKGROUND

Many automation applications employ motion control systems to control machine position and speed. Such motion control systems typically include one or more motors or similar actuating devices operating under the guidance of a controller, which sends position and speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Designers of motion control systems seek to achieve an optimal trade-off between various performance aspects. For example, an aggressively tuned controller may result in a system that tracks a reference position signal with high accuracy and fast response time, but experiences instabilities in the presence of system noise and or other disturbances. Alternatively, tuning the controller more conservatively will improve system stability, but at the expense of response time. The process of selecting suitable gain coefficients for the controller is known as tuning.

Turning the gain coefficients for a given controller determines the controller's bandwidth, which is a measure of responsiveness of the controlled mechanical system to changes in the control signal. The response of the controlled system to a signal from a controller is partially a function of the controller's bandwidth and the physical characteristics of the mechanical system or plant (e.g., inertia, damping, friction, coupling stiffness, resonance, etc.).

In many motion control applications, system designers attempt to tune the motion controller to optimize, to the degree possible, one or more selected performance variables that are considered particularly important, depending on the type of application being performed by the motion system. For example, in some motion control applications the accuracy of the motion system (that is, the ability of the motion system to track closely to the requested speed or position with minimal deviation) may be considered more important than minimizing the time required for the system to respond to a change in the control signal. In such applications, the system designer may attempt to tune the controller to minimize the maximum deviation of the system, with less regard to the speed of the system. In another example application, the robustness of the system, or the ability to recover from applied disturbances, may be considered more important that accuracy. Accordingly, the system designer may attempt to tune the controller to minimize the disturbance settling time of the system, possibly at the expense of accuracy or maximum deviation.

The performance of a motion system when operating under a given set of controller tuning parameters is dependent on a large number of plant variables that characterize the controlled mechanical system, including the inertia, frictions, resonances, coupling stiffnesses, etc. Consequently, finding a controller tuning that achieves a desired performance (e.g., a tuning that optimizes a selected performance parameter) typically requires a laborious trial-and-error approach, as it is difficult to mathematically characterize the relationship between a key tuning parameter and a performance aspect of a motion system given the many other variables (e.g., plant parameters, other tuning parameters, etc.) that determine how the motion system will respond to particular tuning.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for determining a mapping or relationship between variables of interest given a number of independent variables. In example applications specific to motion control systems, the variables of interest may represent a major tuning parameter of a motion controller and a performance variable of the motion system, with independent variables representing plant parameter values, values of other tuning parameters, or other such factors that have an influence on the value of one or both of the variables of interest. Mapping data that quantifies a mapping or functional relationship between the two independent variables can be useful, for example, in determining key controller tuning parameters that optimize a selected performance parameter of the motion system. The mapping information can also be used to predict a performance characteristic of the motion system given a selected key tuning parameter and set of independent variables representing plant characteristics as inputs.

To these and other ends, a curve fitting system described herein is configured to implement a multi-level curve fitting approach. In general, the system implements a technique whereby first curve fitting relationships are established between the first variable of interest and the second variable of interest for each set of values of the independent variables. Then, second curve fitting relationships are established between the coefficients of the previously established curve fitting relationships and one of the independent variables for multiple value sets of the remaining independent variables. These recursive curve fitting operations are repeated until curve fitting relationships have been obtained for all of the independent variables. The system then generates mapping data based on the obtained curve fitting relationships, where the mapping data defines a mapping from the first independent variable to the second independent variable.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
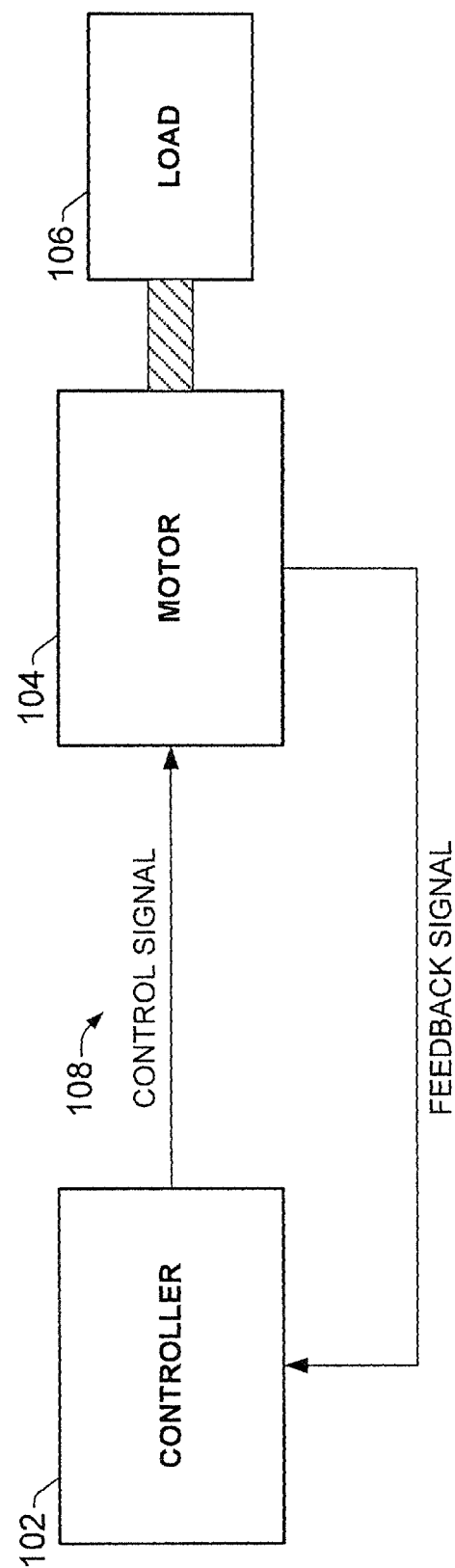
FIG. 1 is a simplified diagram of a closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate generally to techniques for learning and generating mappings between variables of interest given multiple independent variables. Although these techniques are described herein in connection with motion control systems—and in particular with determining mappings between motion control system performance specifications and key tuning parameters—the curve fitting techniques described herein are generally applicable to other types of applications in which relationships between a dependent variable of interest and a set of independent variables are desired.

By way of background, FIG. 1 is a simplified diagram of a closed-loop motion control architecture. Controller 102 is programmed to control motor 104, which drives mechanical load 106. In various example applications, motor 104 may be used to drive an industrial automation application or industrial tool, including but not limited to a machining or material handling robot, a conveyor, a tooling machine, a motorized hand tool, etc. Motor 104 may also be used in the traction and/or propulsion system of an electric vehicle design, including but not limited to an electric or hybrid electric automobile, a bicycles, a forklift or other industrial vehicle, a scooter, a railway vehicle such as a train, or other such vehicles. Motor 104 may also be used in building infrastructure and HVAC (heating, ventilating, and air conditioning) applications that require speed or motion control, such as fans and pumps. Motor 104 may also be used in a home or industrial appliance. For example, motor 104 may be used to drive the drum of a home or industrial washing machine, to control the spinning of a centrifuge, or to control the motion of other such appliances.

Controller 102, motor 104, and load 106 make up the primary components of an example motion control system, wherein linear and/or rotational motion of the load 106 is controlled by motor controller 102. In an example application, load 106 can represent an axis of a single- or multi-axis robot or positioning system. In such applications, controller 102 sends control signal 108 instructing the motor 104 to move the load 106 to a desired position at a desired speed. The control signal 108 can be provided directly to the motor 104, or to a motor drive (not shown) that controls the power delivered to the motor 104 (and consequently the speed and direction of the motor). Feedback signal 110 indicates a current state (e.g., position, velocity, etc.) of the motor 104 and/or load 106 in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. During a move operation, the controller monitors feedback signal 110 to ensure that the load 106 has accurately reached the target position. The controller 102 compares the actual position of the load as indicated by the feedback signal 110 with the target position, and adjusts the control signal 108 as needed to reduce or eliminate error between the actual and target positions.

In another example application, load 106 can represent a spinning load (e.g., a pump, a washing machine, a centrifuge, etc.) driven by motor 104, in which controller 102 controls the rotational velocity of the load. In this example, controller 102 provides an instruction to motor 104 (via control signal 108) to transition from a first velocity to a second velocity, and makes necessary adjustments to the control signal 108 based on feedback signal 110. It is to be appreciated that the resonance estimation techniques of the present application are not limited to use with the example types of motion control systems described above, but rather are applicable for substantially any type of motion control application.

The control signal 108 generated by the controller 102 in response to an error between the desired position or velocity and the target position or velocity (as reported by the feedback signal 110) depends on the controller bandwidth, which is a function of the gain coefficients for the control loop. In general, higher bandwidths result in faster controller tracking and less sensitivity to external disturbances acting on the closed loop system, but may also result in higher instability or reduced accuracy (e.g., greater maximum deviations from a desired position or speed). The behavior of a motion system tuned for a given bandwidth is largely dependent on the mechanical characteristics of the controlled mechanical system. In this regard, there are a number of mechanical characteristics—e.g., inertia, Coulomb and viscous frictions, resonances, coupling stiffnesses, etc.—that affect how the system will perform under a given set of tuning parameters.

Depending on the type of application being carried out by the motion system, system designers may seek to tune the motion control system to substantially optimize a selected performance parameter of interest. For example, for applications in which the ability of the system quickly respond to a change in requested speed or position is considered more important that accuracy, the system designer may attempt to set the controller's tuning parameters to achieve fast response, often at the expense of accuracy or stability. Other types of motion applications may require a greater level of accuracy (e.g., minimal overshoot relative to the requested speed or position), with less importance placed on the system response time. Accordingly, the system designer will seek to tune the system to optimize this performance parameter to the degree possible.

If the relationship between a performance parameter of interest and a key tuning parameter could be accurately quantified or characterized, a designer could more easily determine the particular tuning parameter (or set of tuning parameters) that optimize the performance parameter. Such a relationship could also be used to predict how the motion system will perform, vis-à-vis the performance parameter, under particular tunings or plant configurations.

If a sufficient amount of performance data is collected for a controlled mechanical system over a range of different tuning parameters and plant variables, curve fitting could be used to determine such a mapping between a performance specifications and a major tuning parameter. However, in general, curve fitting can be difficult in cases in which multiple independent variables all contribute to the value of a variable of interest. Curve fitting functions involving multiple independent variables typically require that the relationship between variables of interest and the multiple independent variables are expressed as a single function; that is, that the variable of interest is equal to a mathematical equation that includes the independent variables.

In many cases, however, a single equation that describes the relationship between the independent variables and the variable of interest does not exist. For example, the relationship between the variable of interest and the multiple independent variables may be meshed in such a way that the relationship cannot be expressed as a single equation. Because of these complicated relationships, it is challenging to produce an accurate mapping among these variables. Such a mapping could simplify motion control system design; e.g., by simplifying the process of identifying a suitable tuning parameter that satisfies a desired performance requirement.

To overcome these challenges and to provide a means to characterize the relationship between performance specifications and tuning parameters (or other variables of interest), the curve fitting system described herein implements a multi-level curve fitting approach. According to this approach, the variables of interest can be, for example, key tuning parameters and performance variables representing performance aspects of the motion system. The performance variables can represent, for example, disturbance settling time, maximum deviation, torque/speed noise ratio, phase margin, inertia variation range, open-loop cross-over frequency, or other such performance aspects of the motion system. The curve fitting system described herein first establishes curve fitting relationships (A) between one of the variables of interest ($v_2$) and a first independent variable ($v_1$, the other variable of interest to which $v_2$ is to be mapped) for each case of value sets of the rest of the independent variables (that is, other independent variables not including $v_1$). Then, the system establishes curve fitting relationships (B) between the coefficients of A and a second independent variable ($v_a$) for each case of value sets of the rest of the independent variables (that is, other independent variables not including $v_1$ and $v_a$). This recursive curve fitting process is repeated for all independent variables to obtain curve fitting relationships for all the independent variables.

Rather than finding the coefficients for a predefined single nonlinear mapping function, this multi-level curve fitting approach recursively applies curve fitting techniques on the coefficients of a previous curve fitting with respect to each independent variable. In this way, a function that maps between variables of interest (e.g., a major tuning parameter and a performance variable) given multiple independent variables (e.g., plant parameters and/or other tuning parameters) can be obtained with good precision.

This technique can be used to establish mapping functions between a performance specification and the key tuning parameter of a motion control system, with independent model or plant parameters and/or other tuning parameters as inputs. However, this multi-level curve fitting technique is not limited to use in connection with motion control systems. Rather, the curve fitting techniques described herein can also be used in other types of applications in which relationships between a set of independent variables and one or more dependent variables of interest are desired.

Figure 2:
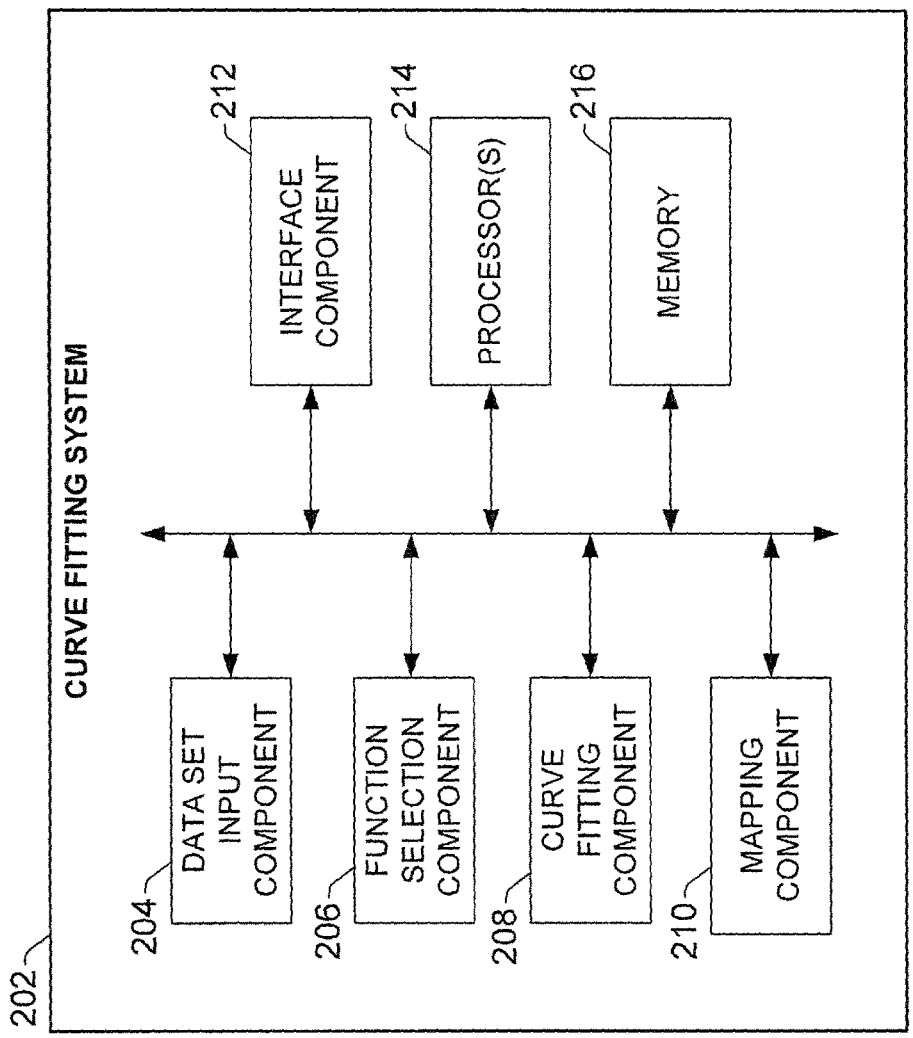
FIG. 2 is a block diagram of an example curve fitting system capable of generating mapping information that maps independent variables to one or more variables of interest.

FIG. 2 is a block diagram of an example curve fitting system 202 capable of generating mapping information that maps independent variables to a variable of interest. Curve fitting system 202 can include a data set input component 204, a function selection component 206, a curve fitting component 208, a mapping component 210, an interface component 212, one or more processors 214, and memory 216. In various embodiments, one or more of the data set input component 204, function selection component 206, curve fitting component 208, mapping component 210, interface component 212, the one or more processors 214, and memory 216 can be electrically and/or communicatively coupled to one another to perform one or more of the functions of the curve fitting system 202. In some embodiments, components 204, 206, 208, 210, and 212 can comprise software instructions stored on memory 216 and executed by processor(s) 214. The curve fitting system 202 may also interact with other hardware and/or software components not depicted in FIG. 2. For example, processor(s) 214 may interact with one or more external user interface device, such as a keyboard, a mouse, a display monitor, a touchscreen, or other such interface devices.

Data set input component 204 can be configured to receive sets of data representing measured, estimated, or simulated values of independent and dependent variables. Data provided to the data set input component 204 can be collected via analytical analysis or simulation of a motion system, or from actual application results measured for a motion system. In an example application, the data sets can represent simulated, measured, or otherwise obtained values of a performance variable (the dependent variable) for the motion system over a range of different tuning and plant parameter values (the independent variables). These data sets will be analyzed by the curve fitting system 202 in order to determine a functional relationship between the dependent variable and the independent variables.

The function selection component 206 can be configured to select a function that can transform the relationship between the variables of interest into a shape to which curve fitting can be more accurately applied with a minimal curve fitting error (that is, a curve fitting error that satisfies a criterion). In general, function selection component 206 will choose a simple monotone function with a reverse function (e.g., a logarithmic function, an exponential function, an inverse function, a square root function, etc.).

The curve fitting component 208 can be configured to perform multi-level curve fitting on the data set according to the techniques to be described in more detail below. The mapping component 210 can be configured to generate a mapping function based on results of the curve fittings obtained by the curve fitting component 208. The mapping function characterizes a relationship between variables of interest given multiple independent variables, all of which are represented by the data set. In the case of motor control applications, an example mapping function may characterize the relationship between a specified performance variable and a major tuning parameter for the motion system. In the particular case of motion systems that support parameterized active disturbance rejection control (ADRC), the mapping function may characterize the relationship between the performance variable and the controller bandwidth, where the bandwidth represents the major tuning parameter of the system.

The interface component 212 can be configured to receive user input and to render output to the user in any suitable format (e.g., visual, audio, tactile, etc.). User input can be, for example, data values to be analyzed, an instruction that initiates generation of a mapping function for a given set of data, selection input that identifies the variables for which a mapping function is to be determined, or other such input. Output generated by the interface component 212 can include mapping data that defines the mapping between two variables of interest, values of a variable of interest corresponding to a specified set of independent variable values based on analysis of the mapping data, or other such outputs. The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
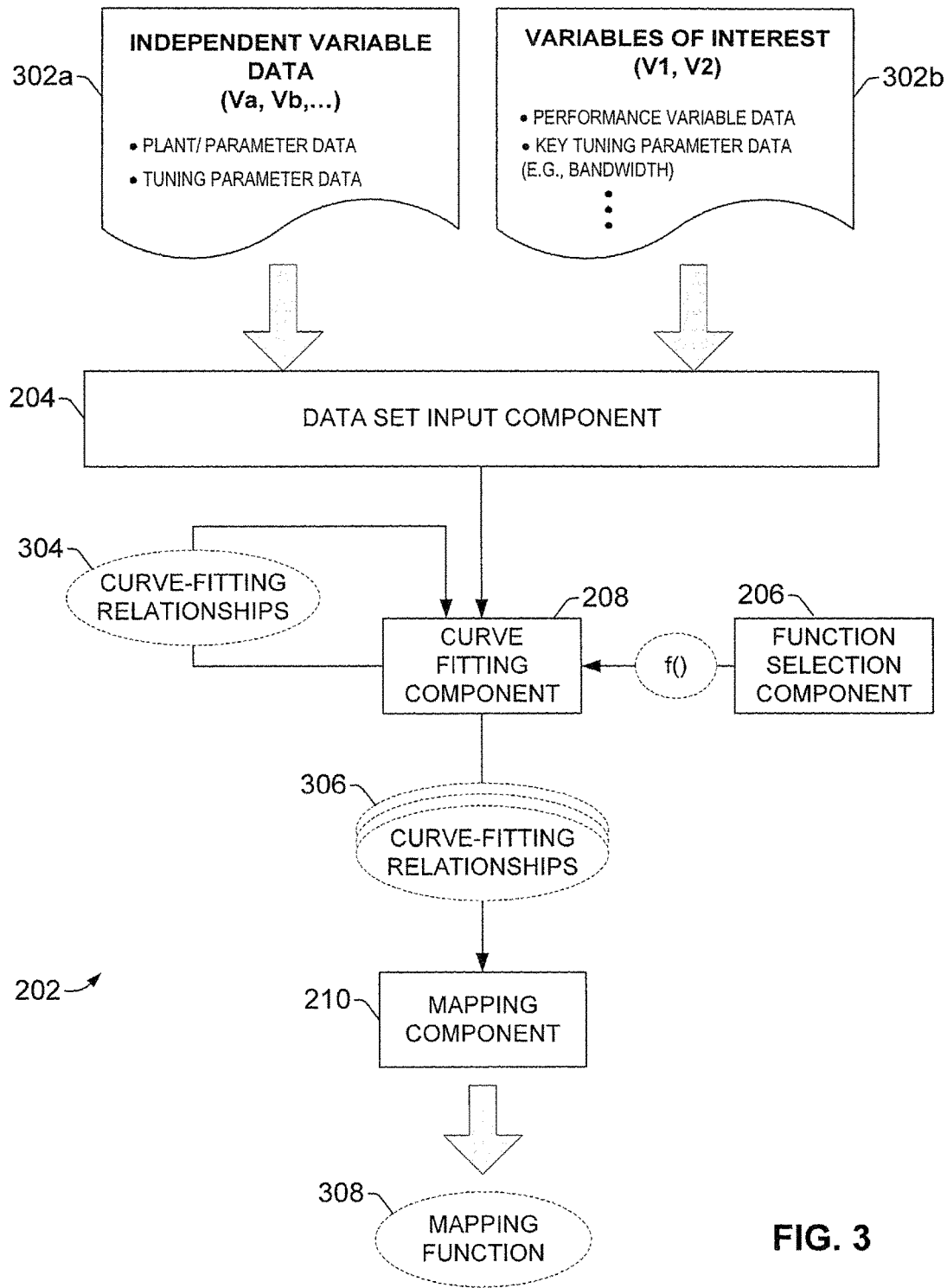
FIG. 3 is a block diagram illustrating example data processing carried out by components of the curve fitting system.

FIG. 3 is a block diagram illustrating example data processing carried out by components of the curve fitting system 202 according to one or more embodiments. The curve fitting system 202 performs analysis on data sets 302 provided to the system 202 representing ranges of values of independent variables as well as values of variables of interest under various scenarios represented by the independent variables. Data set input component 204 can receive these data sets 302 from any suitable source.

In the case of motion control applications, the data 302a representing the independent variables can comprise, for example, plant parameter data representing mechanical characteristics of the motion system, tuning parameter data representing values of tuning parameters (e.g., controller gains, controller bandwidth, etc.) of the motion controller, or other such independent variables. The data 302b representing the variables of interest can comprise, for example, key tuning parameter data representing a major or key tuning parameter (which is also an independent variable whose value affects that of the other variable of interest), as well as performance variable data representing one or more performance characteristics or metrics (e.g., maximum disturbance settling time, maximum deviation of the motion system from a target speed or position, torque or speed noise ratio, phase margin, inertia variation range, open-loop cross-over frequency, etc.) that are dependent on values of the independent variables and the key tuning parameter.

The data 302 provided to the curve fitting system 202 can be obtained using any suitable data collection or generation technique, including but not limited to analytical analysis, simulation of the motion system under a range of different operating conditions (e.g., different simulated controller tunings, different plant parameters, etc.), or actual measured data collected from the motion system under a range of different operating conditions, system configurations, and/or controller tunings.

Once the data 302 to be analyzed is provided to system 202, curve fitting component 208 applies a multiple-level curve fitting strategy to the data. As will be discussed in more detail below, curve fitting component 208 can implement this strategy by first determining curve fitting relationships (denoted A) between a variable of interest and a first of the independent variables for each case of value sets of the rest of the independent variables (that is, the independent variables other than the first independent variable). Once these curve fitting relationships 304 are established, the curve fitting component 208 then determines curve fitting relationships (denoted B) between the coefficients of the previously obtained curve fitting relationship A and a second of the independent variables for each case of value sets of the remaining independent variables (that is, the independent variables other than the first and second independent variables). This sequence is repeated until curve fitting relationships (A, B, C, . . . ) to all the independent variables have been obtained. In general, with the exception of the first obtained curve fitting, the curve fitting component 208 performs each curve fitting on the coefficients of the immediately prior curve fitting in a recursive manner.

Based on the curve fitting relationships 306 obtained by the curve fitting component 208, mapping component 210 generates mapping function data 308 that defines a mapping between the two variables of interest. For motion control applications, the mapping function data 308 may define a mutual mapping between a specified performance variable (e.g., disturbance settling time, maximum deviation, etc.) and a major tuning parameter (which may be the controller bandwidth in the case of ADRC systems, or another controller gain in other types of motion control systems). The mapping function represented by mapping function data 308 can be used by system designers to assist in motion control system design. For example, the mapping function obtained by the curve fitting system 202 can be used to obtain a value of the selected performance variable corresponding to the major tuning parameter when the values of the plant parameters and other tuning parameters are given as inputs. In another example, the mapping function may be used to identify a suitable value for the key tuning parameter—given a set of plant parameter values and other tuning parameters—that optimizes the selected performance aspect of the motion system.

The techniques carried out by the curve fitting system to obtain these mapping functions are now described in more detail. While the following example is described with reference to an example motion control application, the curve fitting and mapping techniques described herein can be used in other types of applications without departing from the scope of this disclosure. In the present motion control example, the system seeks to learn and define a mutual mapping between a specified performance variable and a major tuning parameter, given plant parameters and other tuning parameters as inputs. In the particular case of ADRC systems, the major tuning parameter may be the controller's bandwidth, such that the mapping function generated by the curve fitting system defines a mapping between the selected performance parameter and controller bandwidth. The performance variable may be, but is not limited to, a maximum disturbance settling time, a maximum deviation of the motion system from a target speed or position, a torque or speed noise ratio, a phase margin, an inertia variation range, an open-loop cross-over frequency, or other such performance variables.

The problem is complicated by the fact that the relationship between the variables of interest (e.g., performance parameter and tuning parameter) is partially a function of the independent variables. Due to the complexity of the problem, it may be difficult to obtain a single mathematical equation capable of describing the relationship among the two variables of interest with the other independent variables as inputs. The curve fitting system 202 described herein applies a numerical approach to this problem. In general, the curve fitting system 202 analyzes the data 302 (collected from analytical analysis, simulation, or actual application results), and applies the multiple-level curve fitting strategy described generally above to obtain the mapping function.

In an illustrative example, the mapping functions between two variables of interest—$v_1$ and $v_2$—are to be determined given the input values of independent variables $v_a$ and $v_b$. Although only two independent variables are considered in the present example for clarity, it is to be appreciated that the techniques described herein can be applied using more than two independent variables without departing from the scope of this disclosure.

Initially, values of the second variable of interest $v_2$ are collected in the ranges of interest of $v_1$, $v_a$, and $v_b$. In an example application, the second variable of interest $v_2$ may be a particular performance variable of the motion system, while the first variable of interest $v_1$ is the key tuning parameter of the motion control system whose value affects that of the performance variable. The two independent variables $v_a$ and $v_b$ may be other tuning parameters, plant parameters, or a combination of the two (e.g., a tuning parameter and a plant parameter). In such an example scenario, data may be obtained—either via analytical analysis, simulation, or actual measurement—that records values of performance variable $v_2$ that correspond to respective combinations of the independent variables $v_1$, $v_a$, and $v_b$. Each value range is discretized to a set of value points, such that the collected data is the collection of values for the variable of interest $v_2$ with respect to possible combinations of the value choices of $v_1$, $v_a$, and $v_b$. In an example non-limiting embodiment, the data set may comprise a set of tuples of the form ($v_2$, $v_1$, $v_a$, $v_b$).

The resulting data set 302 is provided to the curve fitting system 202 via data set input component 204. In some embodiments, data set input component 204 may be configured to interface with an external source of the data set 302—such as a simulation system, an analytical system, or another type of system on which the collected data is stored—and to import the data from the external source for curve fitting analysis.

Figure 4:
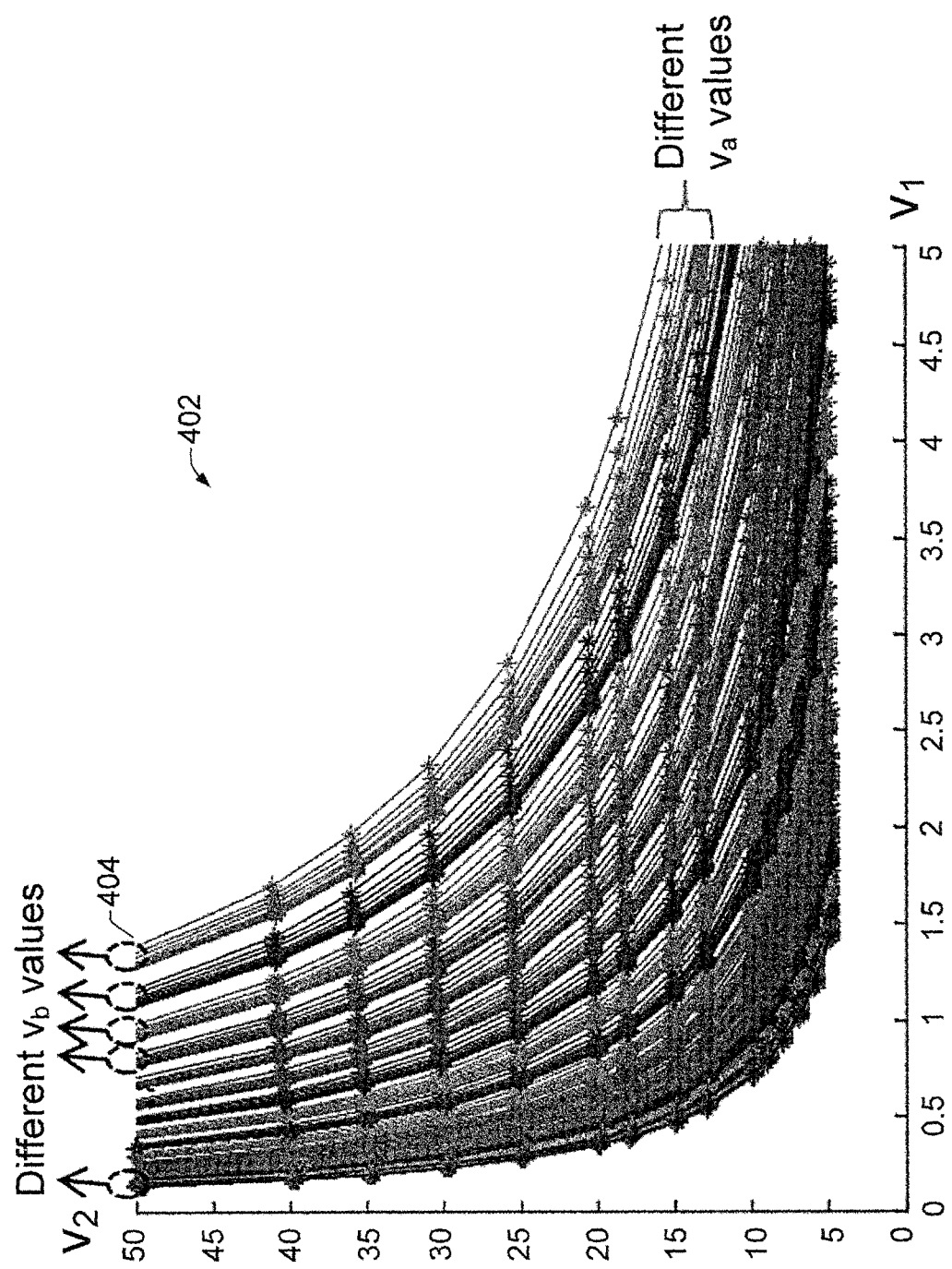
FIG. 4 is a graph of a relationship among four variables for an example data set.

FIG. 4 is a graph 402 of a relationship among the four variables $v_1$, $v_2$, $v_a$, and $v_b$ for an example data set. In FIG. 4, the x-axis and y-axis represent the variables of interest $v_1$ and $v_2$, respectively. Each group of lines 404 (differentiated by shading in FIG. 4) corresponds to a different fixed value of independent variable $v_b$, while each individual line within a given group 404 corresponds to a different fixed value of independent variable $v_a$. Using this standard, each line of graph 402 connects values of variable $v_2$ obtained using a specific, fixed pair of values of $v_a$ and $v_b$ values over a range of values for variable $v_1$.

As illustrated by graph 402, for a given value of $v_1$ (e.g., a value of a major tuning parameter, such as the controller bandwidth in ADRC systems), and respective values of other independent variables $v_a$ and $v_b$ (e.g., other tuning parameters and/or plant parameters), a value of $v_2$ can be obtained (where $v_2$ may be, for example, a performance variable of a motion system). Curve fitting system 202 can generate a mapping function that characterizes this relationship between the variables of interest $v_1$ and $v_2$ as a function of independent variables $v_a$ and $v_b$.

As a first step in the curve fitting process, the data set 302 is provided to the curve fitting system 202 for analysis. Once the data set 302 has been provided to the curve fitting system 202, the system 202 can begin the curve fitting analysis as the second step. First, the function selection component 206 selects appropriate functions $f_1(.)$ and $f_2(.)$ which can transform the relationship between $v_1$ and $v_2$ into a shape that is suitable for curve fitting; that is, a shape that allows the curve fitting to be performed in a manner that satisfies a reasonable maximum fitting error. In general, functions $f_1(.)$ and $f_2(.)$ are strictly monotone functions and have inverse functions. The functions $f_1(.)$ and $f_2(.)$ can be predefined functions stored on memory 216, or can be constructed dynamically by the function selection component 206 based on characteristics of the data set. Example functions $f_1(.)$ and $f_2(.)$ can include, but are not limited to, a logarithmic function (log(.)), an exponential function (exp(.)), an inverse function (1/x), a square root function (sqrt(.)), or other such monotonic functions.

In the present example, a logarithmic function log(.) is chosen to make the mapping more suitable for curve fitting. The curve fitting component 208 transforms the variables of interest using the selected logarithmic function to yield transformed variables of interest $\hat{v}_1$ and $\hat{v}_2$, as given by:

$$\hat{v}_1 = f_1(v_1) = -\log(v_1) \tag{1}$$

$$\hat{v}_2 = f_2(v_2) = \log(v_2) \tag{2}$$

Figure 5:
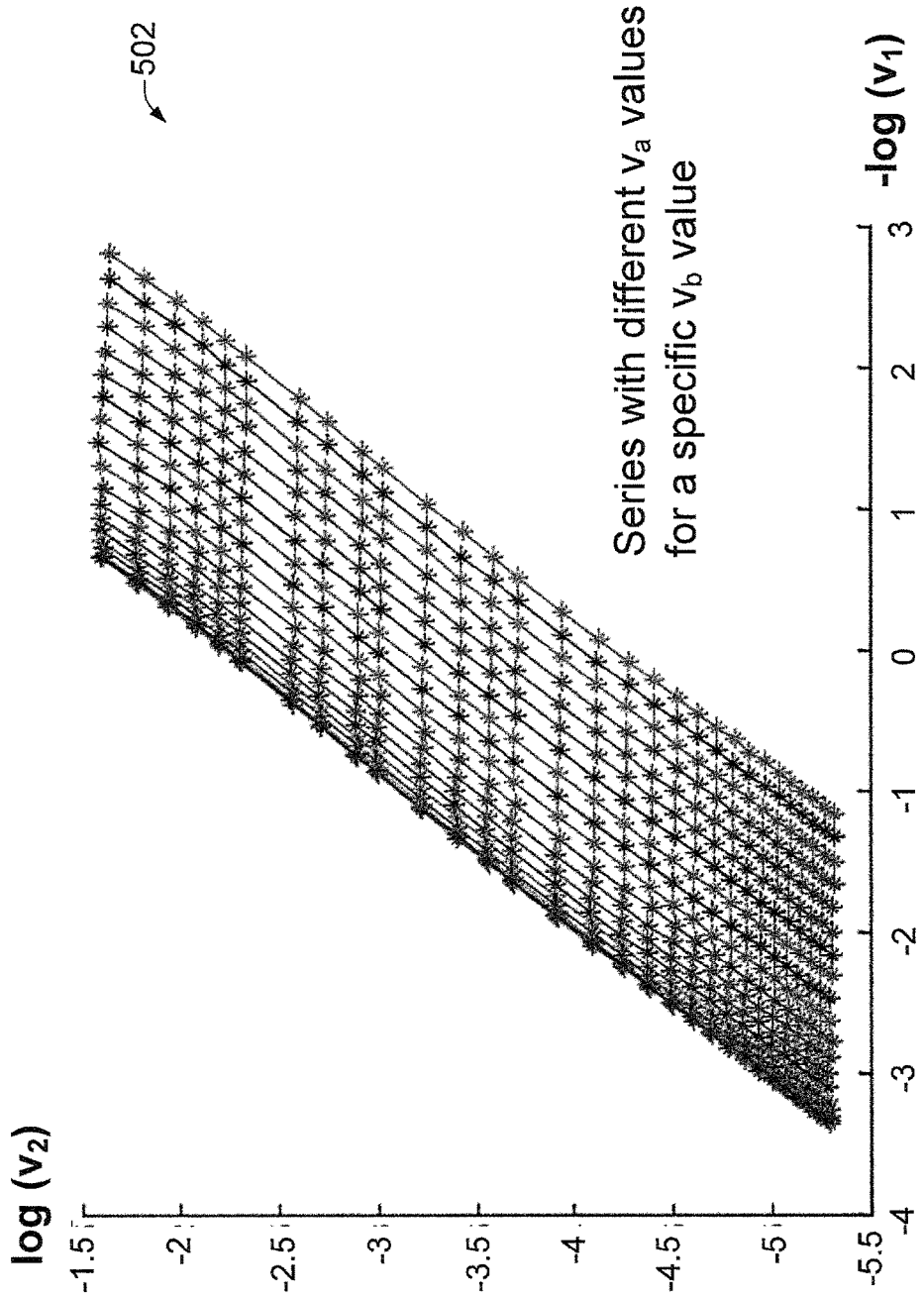
FIG. 5 is a graph that plots the relationships between transformed variables of interest for a specific value of an independent variable over a range of different values of another independent variable.
Figure 6A:
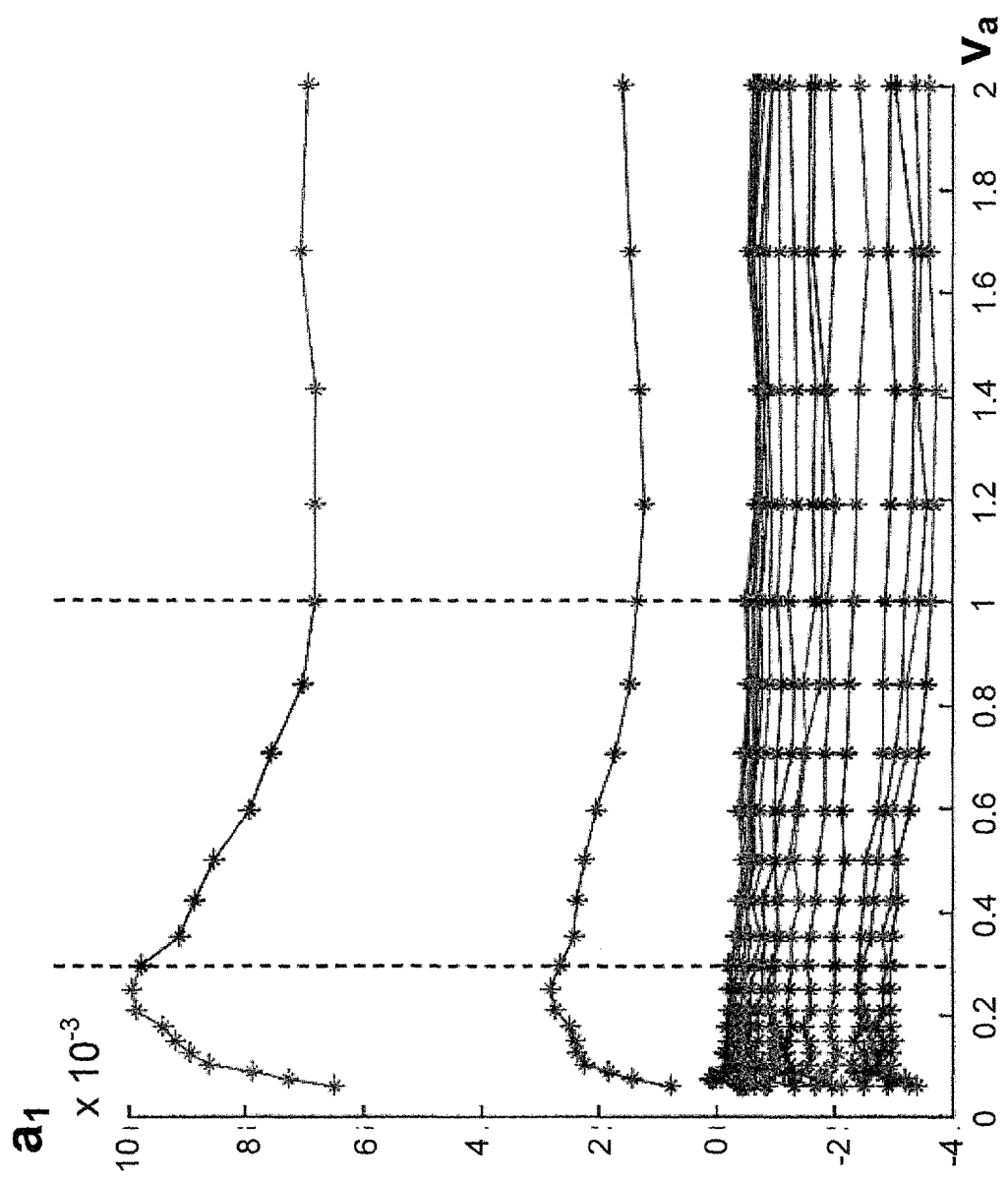
FIGS. 6A-6D are graphs showing relationships between each element of a curve fitting vector and an independent variable for a range of values of another independent variable.
Figure 6B:
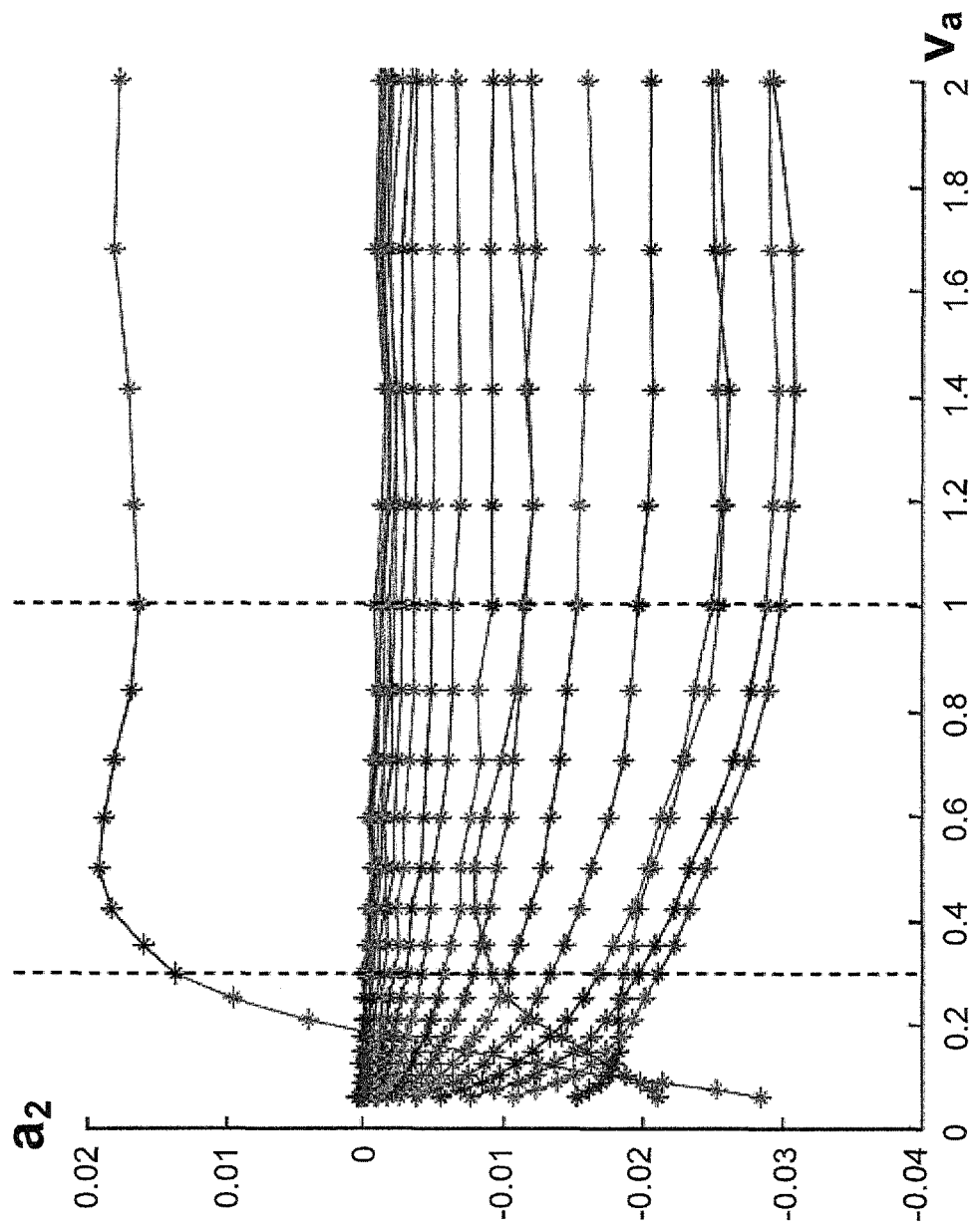
Figure 6C:
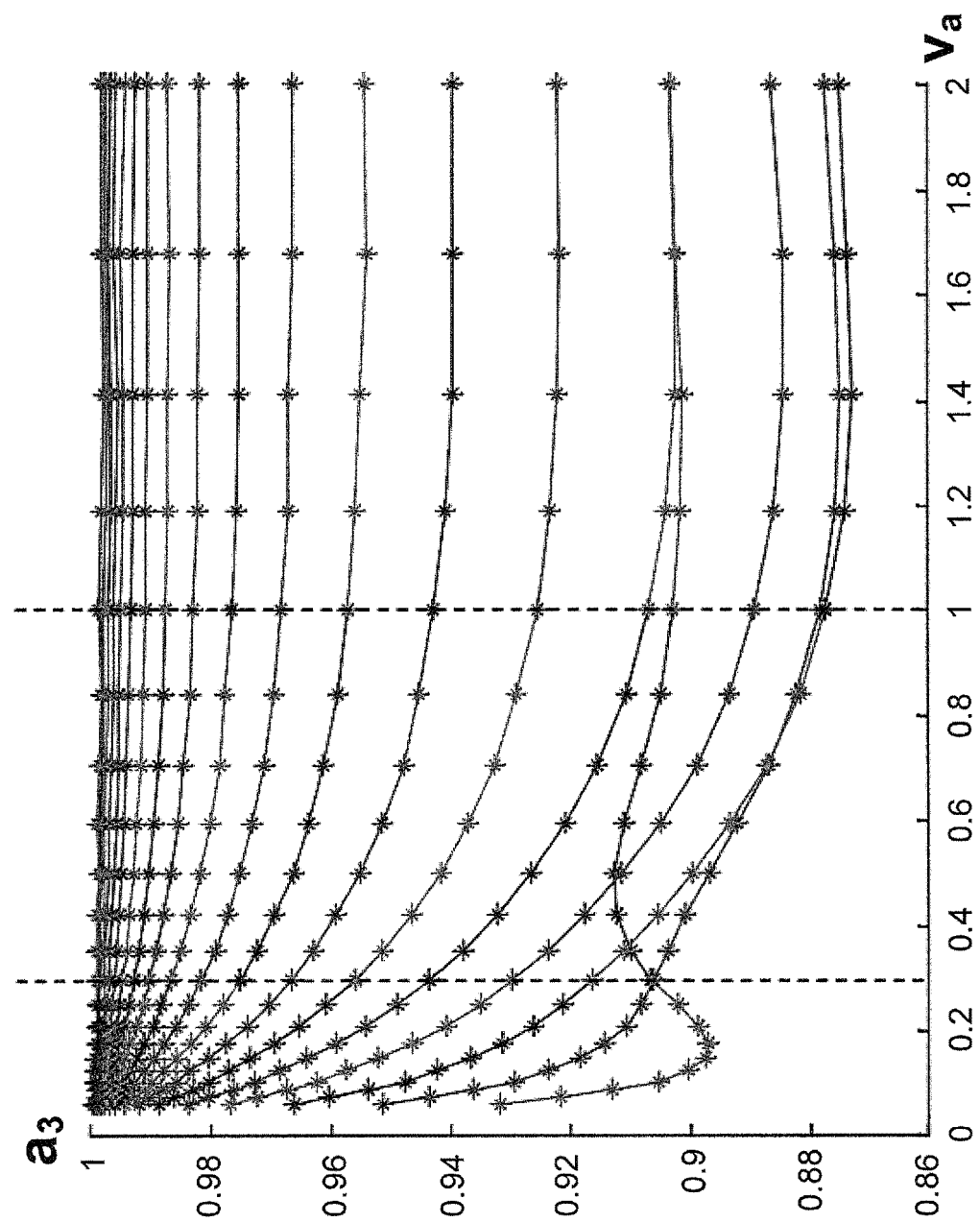
Figure 6D:
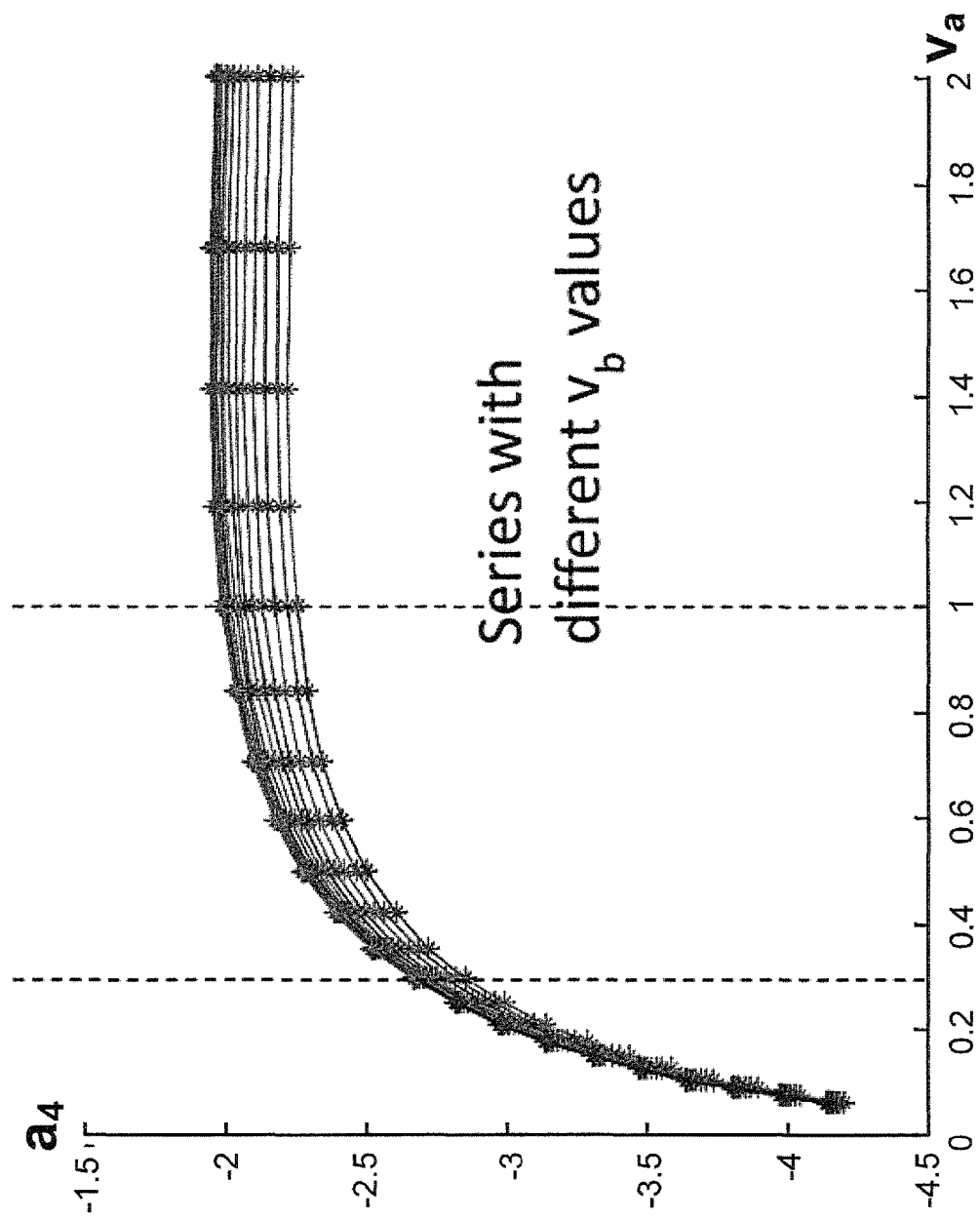
Figure 7A:
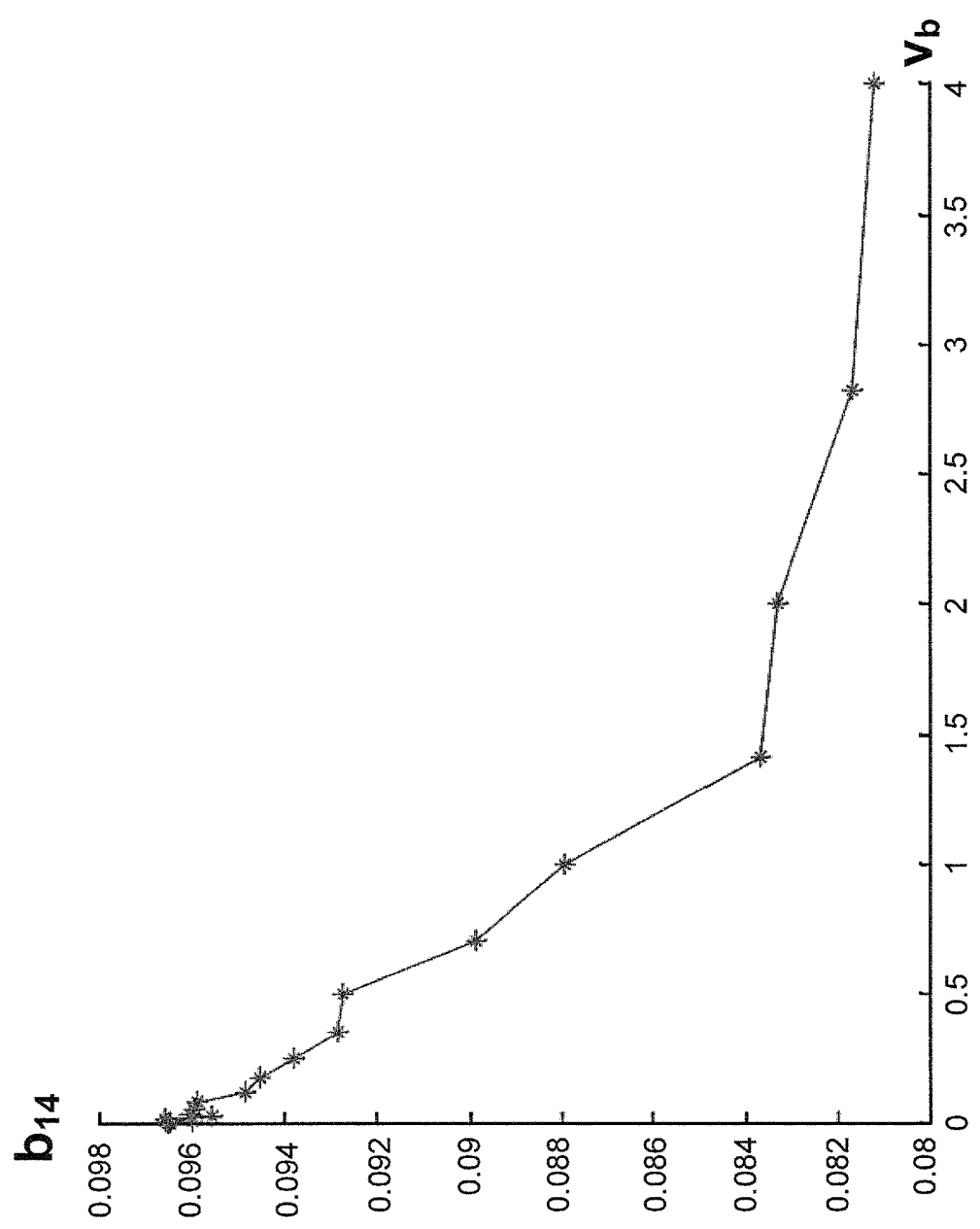
FIGS. 7A-7D are graphs depicting the relationships between some elements of a curve fitting vector and an independent variable.
Figure 7B:
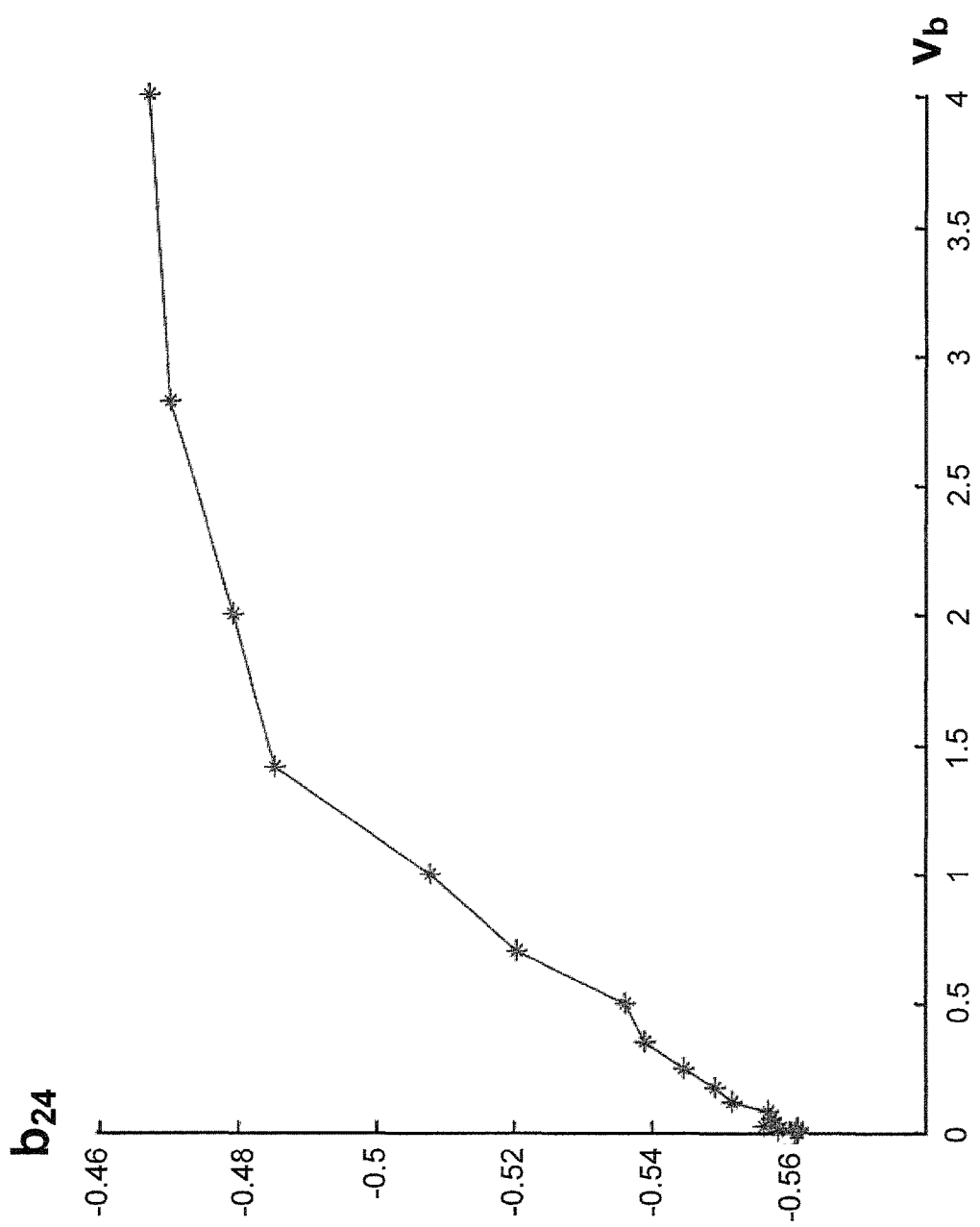
Figure 7C:
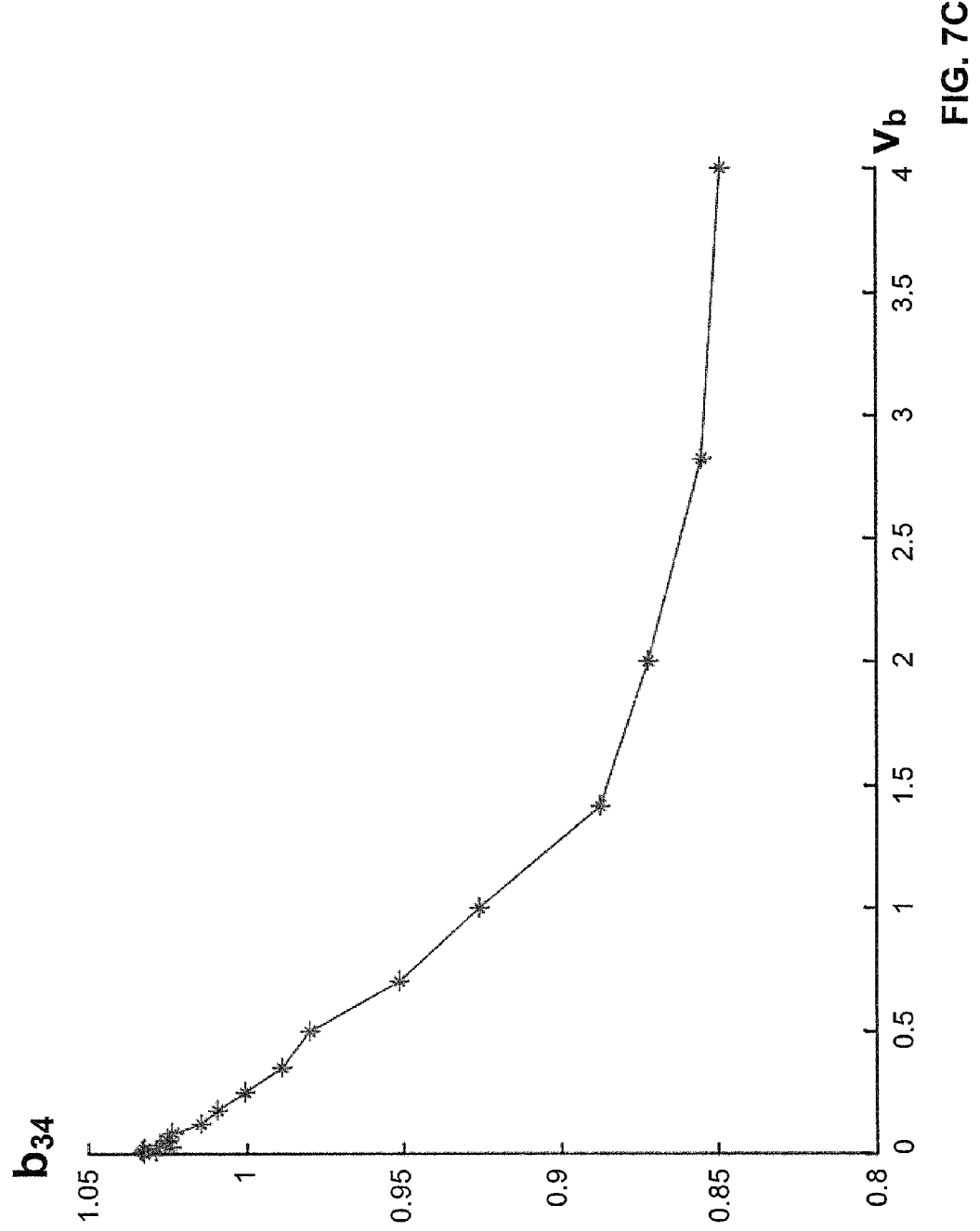
Figure 7D:
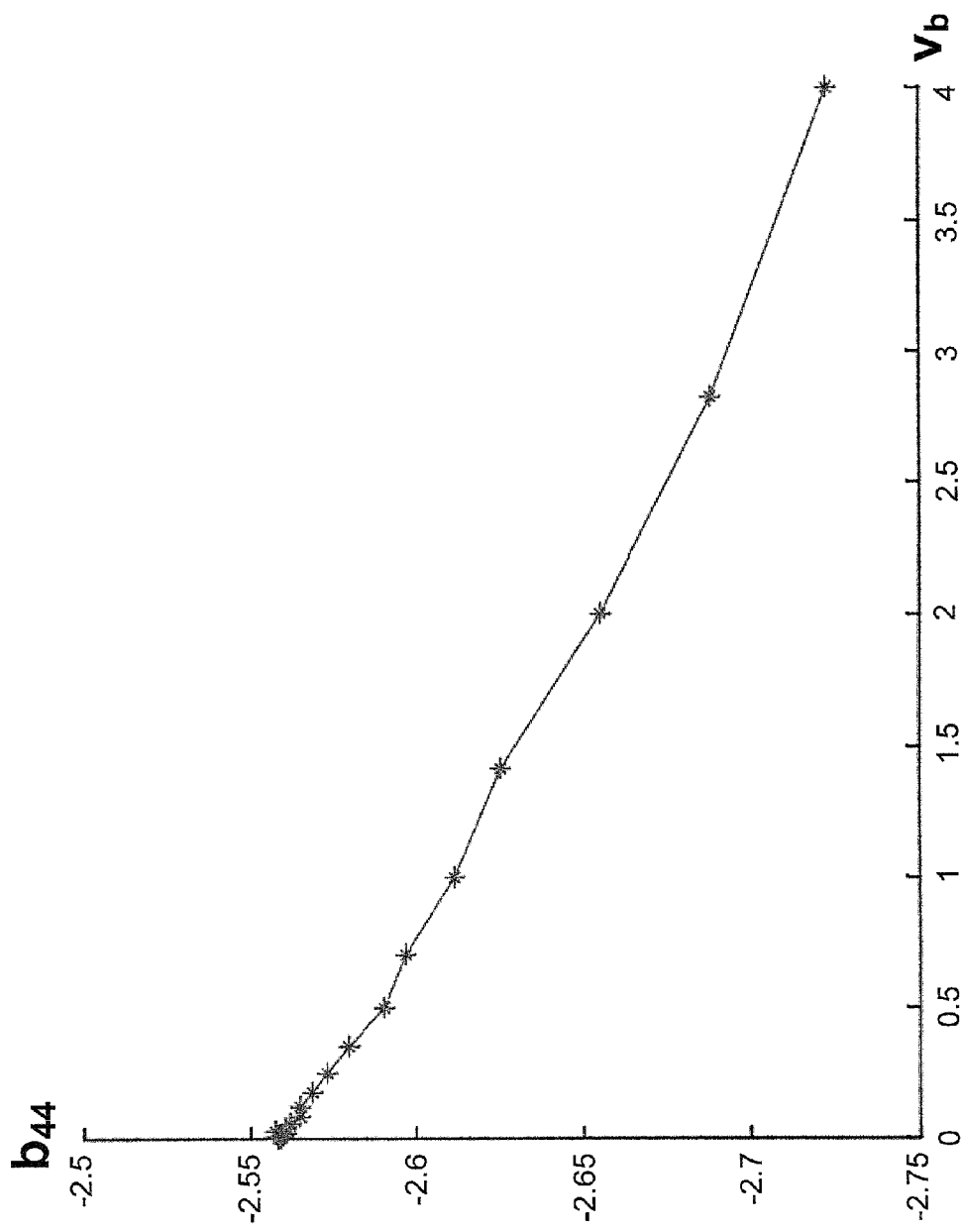

FIG. 5 is a graph 502 that plots the relationships between the transformed variables of interest $\hat{v}_1$ and $\hat{v}_2$ for a specific value of independent variable $v_b$ over a range of different values of independent variable $v_a$. That is, each line plotted in graph 502 corresponds to a specific, fixed pair of values for $v_a$ and $v_b$, where the value of $v_b$ is the same for each line and the value of $v_a$ varies between the lines.

Once the transformed variables of interest $\hat{v}_1$ and $\hat{v}_2$ are obtained, the system 202 begins the third step, whereby curve fitting component 208 performs curve fitting from $v_1$ to $v_2$ for all pairs of the other independent variables $v_a$ and $v_b$ values. Although any suitable curve fitting technique for this step is within the scope of this disclosure, a cubic polynomial fitting is chosen for the present example. This first curve fitting operation determines curve fitting relationships between variable of interest $v_2$ and the first independent variable $v_1$ (which is also a variable of interest that is ultimately to be mapped to $v_2$) for respective combination of values of the other independent variables $v_a$ and $v_b$. In the present example, only two other independent variables—$v_a$ and $v_b$—are considered. However, it is to be appreciated that the technique described herein can be applied in scenarios in which there are more than two other independent variables. In such scenarios, the curve fitting performed during this step will establish curve fitting relationships between $v_2$ and $v_1$ for respective combinations of value sets of the other independent variables.

If $g_a(.)$ is a matrix operator representing curve fitting, the curve fitting performed during this step is given by:

$$v_2 = g_a(V_1, A) = V_1 A \quad (3)$$

where $V_1 = [\hat{v}_1^3, \hat{v}_1^2, \hat{v}_1, 1]$ and $A = [a_1, a_2, a_3, a_4]^T$. $V_1$ is a row array containing the powers of transformed variable $\hat{v}_1$ from n to 0 (n being the polynomial curve fitting order, where n=3 in the present example), and A is a one-dimensional polynomial coefficient array (in the case of non-polynomial curve fittings, A can comprise other fitting function parameters). Since the present example uses a cubic polynomial fitting function for the curve fitting, $g_a(.)$ is a matrix operator. However, in embodiments in which non-polynomial fitting functions are used, $g_a(.)$ may instead be another type of fitting function that takes $V_1$ and A as inputs.

By performing the curve fitting operation given by equation (3) for each pair of independent variable values $v_a$ and $v_b$, a polynomial coefficient column vector array A (a relationship between $v_2$ and the first independent variable $v_1$ is found for respective sets of values of the other independent variables $v_a$ and $v_b$. FIGS. 6A-6D are graphs showing the relationship between each element of vector A ($a_1$, $a_2$, $a_3$, and $a_4$) and independent variable $v_a$ for a range of values of independent variable $v_b$. In the respective graphs of FIG. 6A-6D, each line corresponds to a different value of independent variable $v_b$.

After performing the third step described above (performing curve fitting from $v_1$ to $v_2$ for multiple pairs of $v_a$ and $v_b$ values), it is possible that no single curve fitting function can be applied to obtain a reasonable maximum fitting error. Accordingly, after performing the curve fitting from $v_1$ to $v_2$ for each available pair of $v_a$ and $v_b$ values, the curve fitting component 208 can make a determination as to whether the reasonable maximum fitting error is satisfied. The curve fitting component 208 can be configured to use any suitable technique for determining the maximum curve fitting error, and for determining whether this maximum curve fitting error is less than a defined maximum error.

In response to determining that the maximum curve fitting error is not satisfied, the curve fitting component 208 can segment the value ranges of the independent variables into multiple ranges and perform curve fitting for each range. For example, in the relationships shown in FIG. 6, the range of $v_a$ can be divided into three sections, as depicted in each graph. The curve fitting component 208 can perform curve fitting on each section (that is, on each range of $v_a$ corresponding to each of the three sections), and the results are inherited by the next level curve fitting.

Once the curve fitting of the third step is complete, the system 202 carries out the fourth step, whereby the function selection component 206 next finds a function $f_a(.)$ that yields a suitable curve fitting from the next independent variable $v_a$ to A (that is, a curve fitting from $v_a$ to A that satisfies a reasonable maximum fitting error). Similar to functions $f_1(.)$ and $f_2(.)$, function $f_a(.)$ is a strictly monotone function having an inverse function. In various embodiments, functions $f_1(.)$, $f_2(.)$, and $f_a(.)$ may be the same function, or may be different functions. The curve fitting component 208 transforms independent variable $v_a$ using the selected function $f_a(.)$ to yield transformed independent variable $\hat{v}_a$, as given by:

$$\hat{v}_a = f_a(v_a) \quad (4)$$

The curve fitting component 208 then finds the mapping:

$$A = g_b(V_a, B) = V_a B \quad (5)$$

where $g_b(.)$ is a matrix operator representing curve fitting, $V_a = [\hat{v}_a^3, \hat{v}_a^2, \hat{v}_a, 1]$, and $$B = \begin{bmatrix} b_{11} & \cdots & b_{14} \\ \vdots & \ddots & \vdots \\ b_{41} & \cdots & b_{44} \end{bmatrix}.$$

$V_a$ is a row array containing powers of transformed independent variable $\hat{v}_a$ from n to 0 (where n is the polynomial curve fitting order, and n=3 in the present example), and B is a two-dimensional polynomial coefficient array. This curve fitting step yields a curve fitting relationship (B) between coefficients of the previously obtained curve fitting relationship (A, which is the curve fitting relationship between $v_2$ and the first independent variable $v_1$) and the second independent variable $v_a$, for each set of values of the remaining independent variables (that is, the other independent values not including $v_1$ and $v_a$). In the present example, $v_b$ is the only remaining independent variable at this stage. As such, this curve fitting obtains a polynomial matrix B for each value of independent variable $v_b$.

In the present example, $\hat{v}_a = f_a(v_a) = v_a$. FIGS. 7A-7D are graphs depicting the relationships between some of the elements of B ($b_{14}$, $b_{24}$, $b_{34}$, and $b_{44}$) and independent variable $v_b$.

In the present example, since there are only three independent variables ($v_1$, $v_a$, and $v_b$), the system 202 will proceed to the fifth step once curve fitting relationship B is obtained. However, in scenarios in which there are more than three independent variables, the fourth step can be repeated in order to obtain curve fitting relationships to all the independent variables. That is, each repeated performance of the curve fitting having the form of equation (5) yields a curve fitting relationship between coefficients of the previously obtained curve fitting relationship (that is, the curve fitting relationship obtained via the immediately prior curve fitting operation) and the next independent variable for each set of values of the remaining independent variables (that is, the subset of independent variables not including those for which curve fittings have already been obtained by previous curve fitting operations). These curve fittings are repeated until curve fitting relationships are obtained for all the independent variables.

When curve fitting relationships for all independent variables have been obtained as described above, curve fitting system 202 proceeds to the fifth step. In this step (continuing with the present example in which there are only three independent variables $v_1$, $v_a$, and $v_b$), the function selection component 206 selects a function $f_b(.)$ that transforms the last independent variable $v_b$ to a format that will yield curve fitting to B (the previously obtained curve fitting relationship) that satisfies a maximum curve fitting error. Similar to functions $f_1(.)$, $f_2(.)$, and $f_a(.)$ described above, function $f_b(.)$ is a strictly monotone function having an inverse function, and may be the same function as any or all of the previous transforming functions. The curve fitting component 208 transforms independent variable $v_b$ using the selected function $f_b(.)$ to yield transformed independent variable $\hat{v}_b$, as given by:

$$\hat{v}_b = f_b(v_b) \qquad (6)$$

In the present example, $\hat{v}_b = f_b(v_b) = v_b$.

The curve fitting component 208 then finds the mapping:

$$B = g_c(V_b, C) = \begin{bmatrix} V_b C_1 \\ V_b C_2 \\ V_b C_3 \\ V_b C_4 \end{bmatrix} \qquad (7)$$

where $g_c(.)$ is a matrix operator representing curve fitting; $V_b = [\hat{v}_b^3, \hat{v}_b^2, \hat{v}_b, 1]$; $C_1$, $C_2$, $C_3$, and $C_4$ are square matrices; and C is the three-dimensional array containing $C_1$, $C_2$, $C_3$, and $C_4$.

Thus, a three-dimensional polynomial matrix C is generated by the curve fitting component 208. This final curve fitting step yields a curve fitting relationship (C) between coefficients of the previously obtained curve fitting relationship (B) and the third (and final) independent variable $v_b$.

If the range of $v_b$ was divided into three sections for the curve fitting operation of the third step in order to obtain a suitable maximum curve fitting error (as described above), the curve fitting of the fifth step yields a matrix C having 3*3*4*4=144 coefficients.

In the present example, in which there are only three independent variables, the curve fitting steps are complete when the matrix C is obtained. In the general case, if there are more than three independent variables, the final curve fitting will yield a higher-order matrix for the final curve fitting relationship. That is, the polynomial coefficient array for the final curve fitting relationship with have M dimensions, where M corresponds to the number of independent variables.

Once the curve fitting relationships have been obtained for all independent variables via the foregoing steps obtained, the mapping component 210 generates a mapping function representing the mapping from $v_1$ to $v_2$ (the variables of interest). In the present example in which there are only three independent variables, the mapping function can be given as:

$$v_2 = f_2^{-1}\left(V_1 V_a \begin{bmatrix} V_b C_1 \\ V_b C_2 \\ V_b C_3 \\ V_b C_4 \end{bmatrix}\right) \qquad (8)$$

Figure 8:
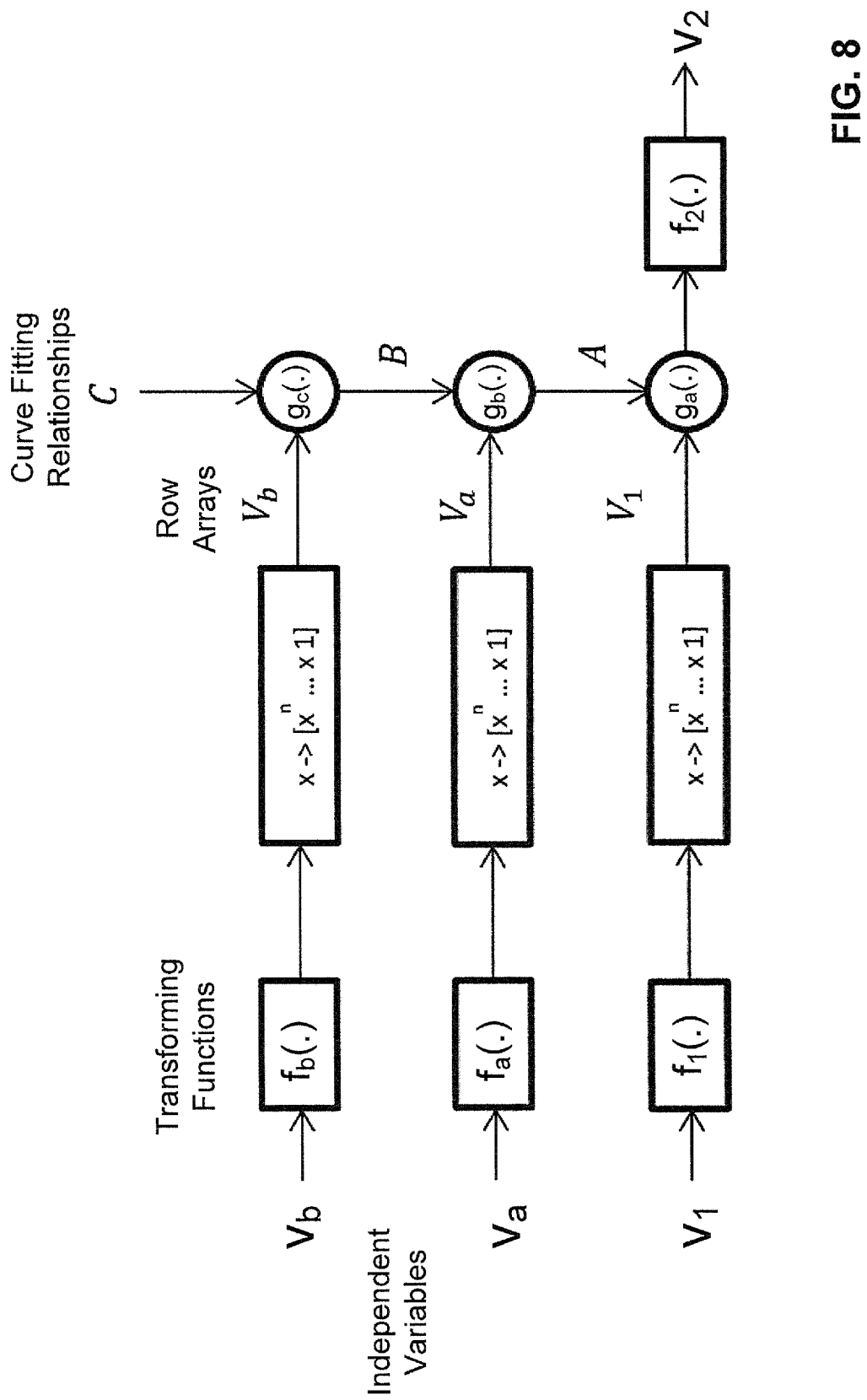
FIG. 8 is a block diagram representing a mapping function derived based on multi-level, recursive curve fitting relationships.

FIG. 8 is a block diagram representing the mapping function given by equation (8). The mapping function defines a mapping from $v_1$ to $v_2$, given independent variables $v_a$ and $v_b$ as inputs. A similar approach can be used to obtain the mapping from $v_2$ to $v_1$, given $v_a$ and $v_b$ as inputs.

Mapping component 210 can generate mapping function data 308 (see FIG. 3) representing a mapping function having the general form of equation (8) or, in scenarios in which there are more than three independent variables, an appropriate form derived using similar techniques. In general, while FIG. 8 depicts a mapping from $v_1$ to $v_2$ given two other independent variables ($v_a$ and $v_b$) as inputs, the mapping function illustrated in FIG. 8 can be appropriately expanded to accommodate greater numbers of independent variables. As described above, in such scenarios, the recursive curve fitting operation of step three (described above) will be repeated as necessary until the appropriate number of curve fitting relationships (beyond the three relationships A, B, and C depicted in FIG. 8) have been obtained for each independent variable. The mapping function illustrated in FIG. 8 can then be expanded to include the appropriate number of independent variable inputs (e.g., $v_c$, $v_d$, etc.), as well as corresponding transforming functions, row arrays, and curve fitting operators.

The technique described above utilizes a recursive curve fitting technique, whereby curve fitting relationships A (represented by a polynomial coefficient array) between the two variables of interest $v_1$ and $v_2$ for different combinations of values of the other independent variables is obtained, and these results are then used to determine curve fitting relationships B between the coefficients of A and one of the remaining independent variables for each combination of values of the remaining independent variables. This recursive technique is repeated until relationships (A, B, C . . . ) for all independent variables are obtained. Then, based on these obtained curve fitting relationships, the system generates the mapping function represented by the block diagram of FIG. 8 (and given by equation (8) above in the case of three independent variables).

Figure 9:
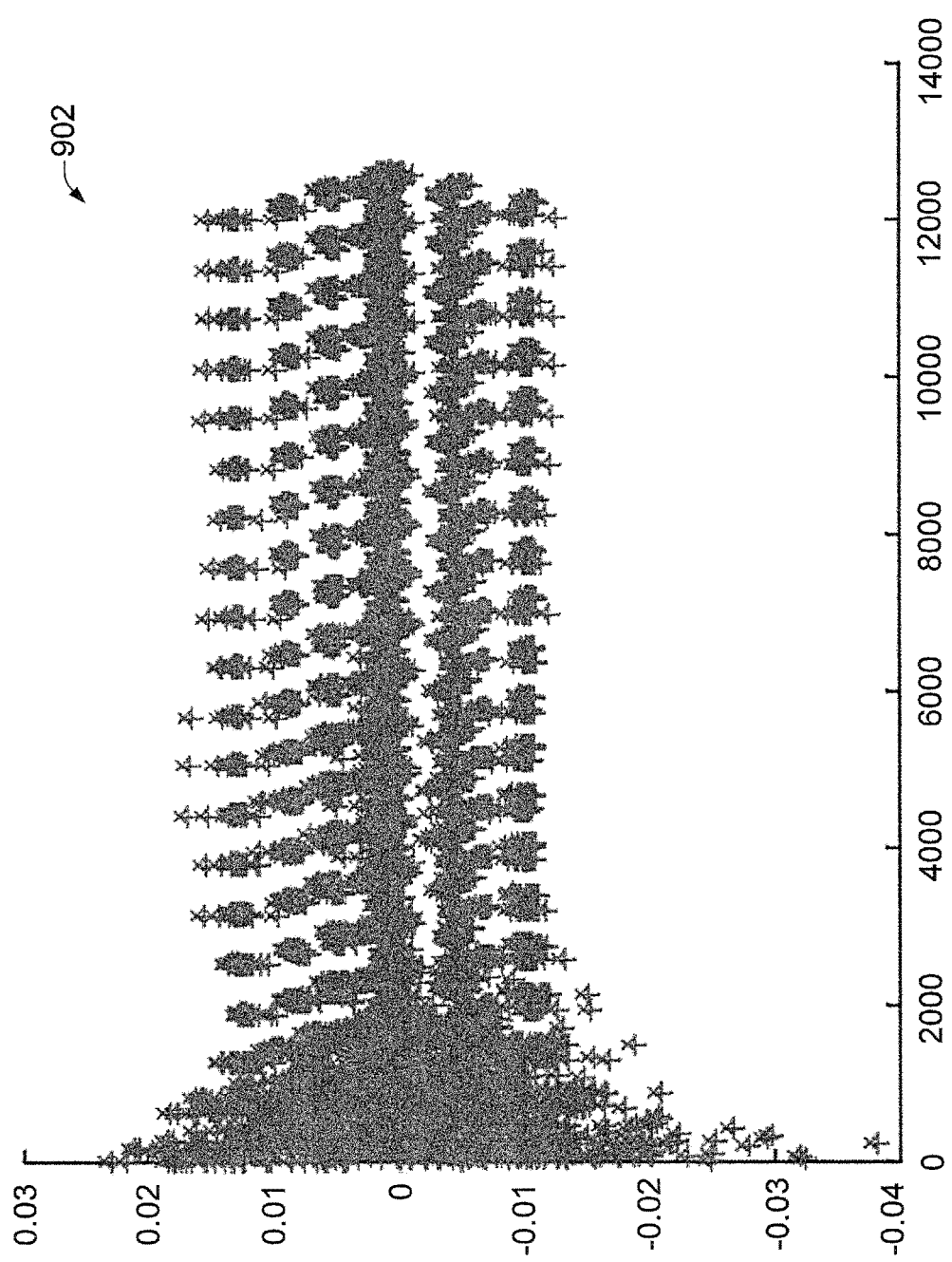
FIG. 9 is a graph of a curve fitting error measured for an example mapping function between two variables of interest.
Figure 10:
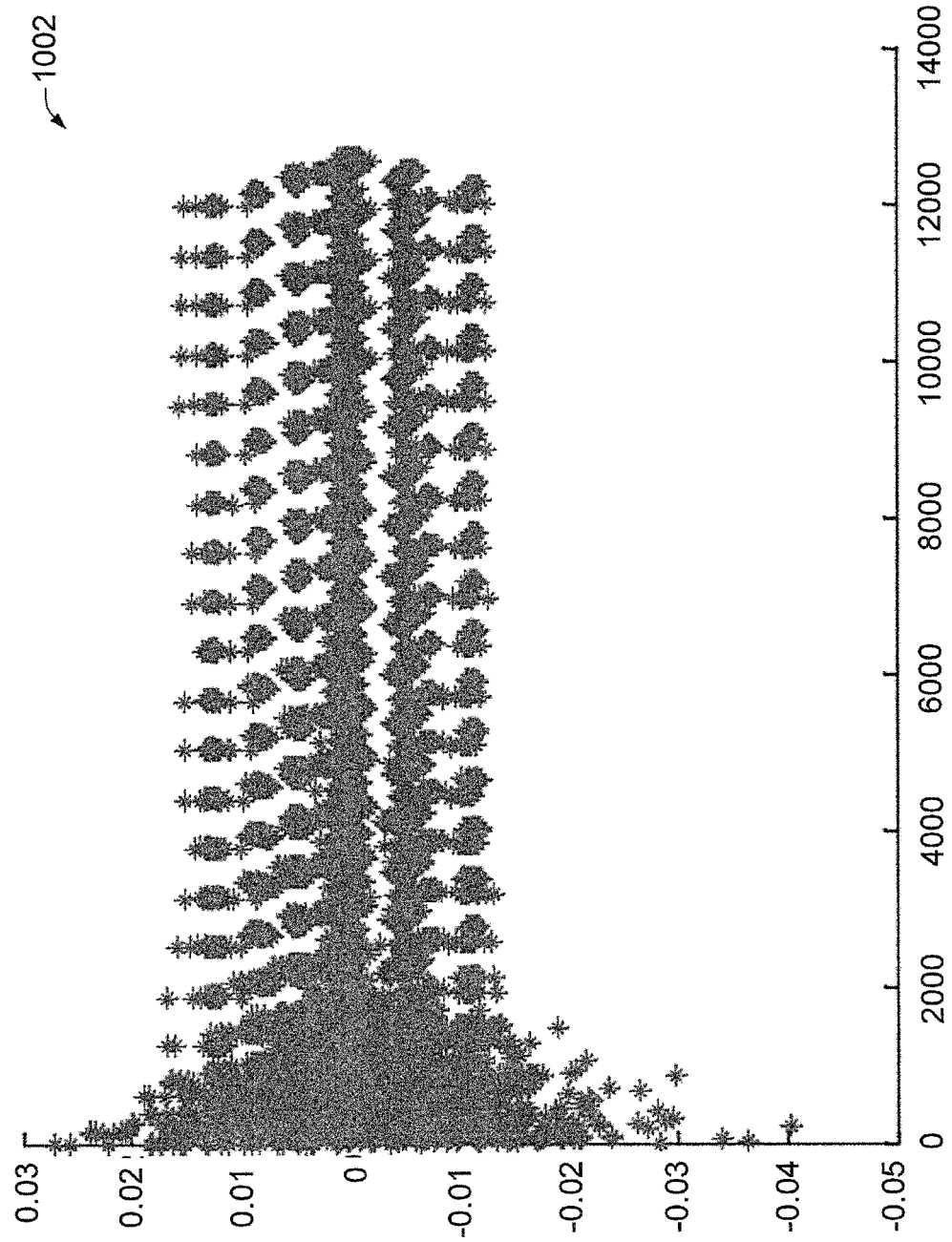
FIG. 10 is a graph of a curve fitting error measured for an example mapping function between two variables of interest.

This technique can achieve an accurate mapping between the two variables of interest. FIG. 9 is a graph 902 of the curve fitting error calculated for the mapping function from $v_1$ to $v_2$ represented by equation (8). In graph 902, the x-axis contains test cases with a range of value combinations for $v_1$, $v_a$, and $v_b$. FIG. 10 is a graph 1002 of the curve fitting error of a mapping function from $v_2$ to $v_1$ obtained using similar methods, in which the x-axis contains test cases for a range of value combinations for $v_1$, $v_a$, and $v_b$. As can be seen in these figures, the maximum fitting error is less than 4% in both example cases.

Figure 11:
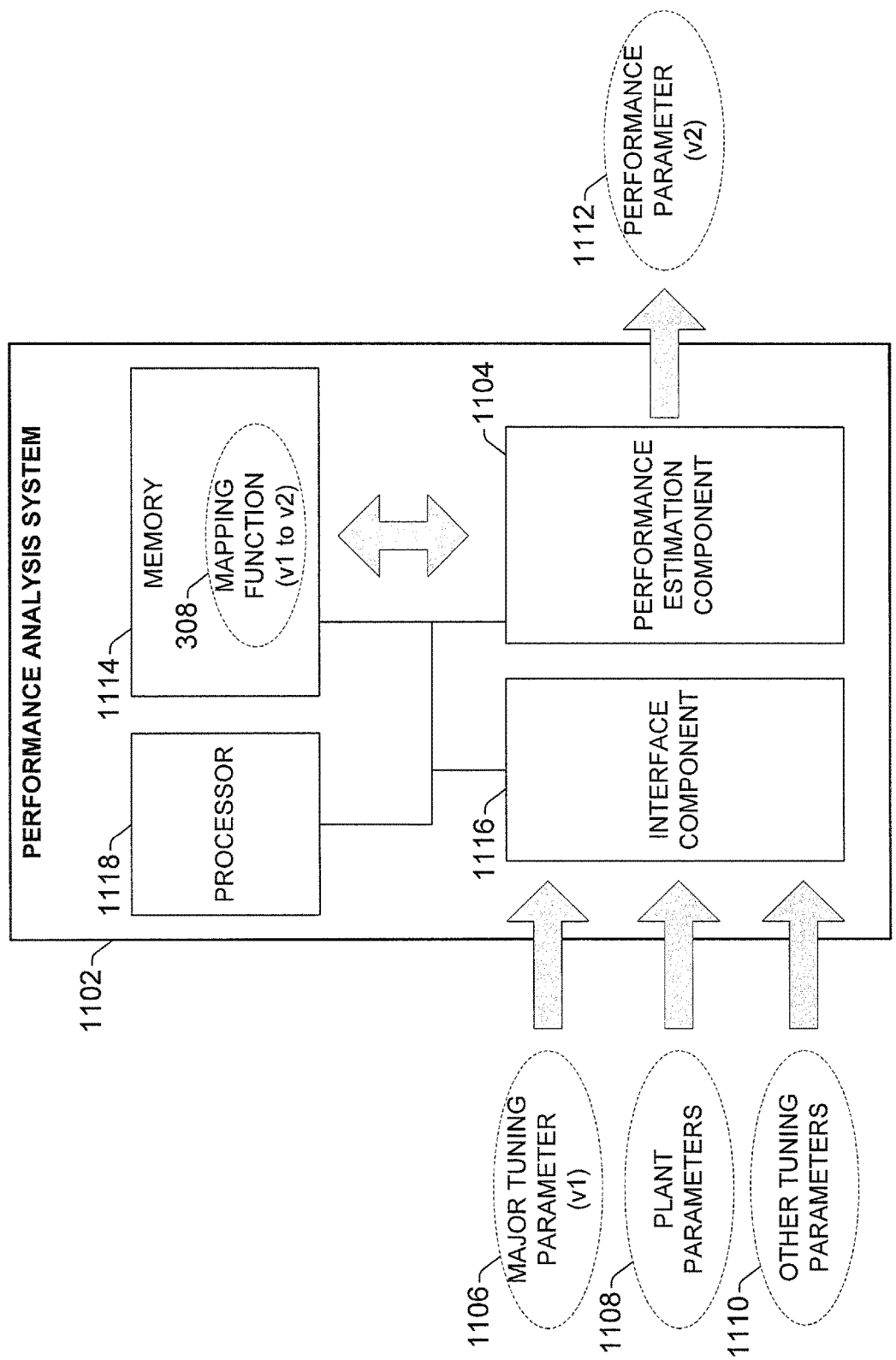
FIG. 11 is a block diagram of an example performance analysis system that leverages a mapping function generated by the curve fitting system to generate performance parameter estimates for a motion system.

Once obtained, the mapping function can be used in a variety of applications. As noted above, in the case of motion control systems, the variables of interest may be a major tuning parameter of the motion system ($v_1$) and a selected performance parameter of the motion system ($v_2$), while the other independent variables $v_a$, $v_b$, . . . may represent plant parameters and/or other tuning parameters of the motion system. In an example application relating to motor control, such a mapping function can be used in a performance analysis system that generates estimates of a performance variable for a motion system given the independent variables as inputs. FIG. 11 is a block diagram of an example performance analysis system 1102 that leverages a mapping function 308 generated by the curve fitting system 202 to generate performance parameter estimates for a motion system. In this example, mapping function data 308 has been generated by curve fitting system 202 according to the techniques described above. In some embodiments, the performance analysis system 1102 may be a separate system relative to curve fitting system 202. In such embodiments, the curve fitting system 202 can be configured to export the mapping function data 308 (that is, data that defines the mapping function) to the performance analysis system 1102 for use in connection with generating performance variable estimates. In other embodiments, the performance analysis system 1102 and the curve fitting system 202 may be integrated sub-systems of a common analytical and/or development system. Such analytical or development systems may provide a common analysis and design environment that can both generate mapping functions for a motion system based on analytical, simulated, or measured motion system data, as well as generate estimated performance variable values for the motion system under hypothetical conditions represented by the independent variable inputs.

Performance analysis system 1102 can store the mapping function data 308 in memory 1114 such that the mapping function can be referenced by a performance estimation component 1104. An interface component 1116 allows a user to enter values for the independent variables representing a particular set of controller tuning parameters and/or plant parameters of the motion system. In this example, the mapping function data 308 defines a mapping function that maps from the major tuning parameter ($v_1$) to a particular performance parameter ($v_2$) for a range of plant parameters and other tuning parameters. The performance parameter can be substantially any performance characteristic of the motion system whose value is a function of the major tuning parameter, the plant parameters, and/or the other tuning parameters (e.g., disturbance settling time, maximum deviation, torque/speed noise ratio, phase margin, inertia variation range, open-loop cross-over frequency, or other such performance aspects). In some embodiments, the interface component 1116 can generate a user interface that prompts the user to enter the major tuning parameter value 1106, one or more values of the plant parameter(s) 1108, and one or more values of the other tuning parameter(s) 1110. In this regard, the interface component 1116 can be configured to identify which input values are required based on the independent variables defined by the mapping function data 308, and to render suitable prompts on the user interface to facilitate entry of those inputs.

After the inputs 1106, 1108, and 1110 have been entered, performance estimation component 1104 can reference or analyze the mapping function data 308 to determine the performance parameter value corresponding to the values of the inputs. This performance parameter value represents the estimated value of the performance parameter for the motion system under the conditions representing by the inputs (e.g., the controller tuning and plant configuration). The performance analysis system 1102 can output this performance parameter value as an output 1112 (e.g., by rendering the value on the user interface or by exporting the output 1112 to another system).

Figure 12:
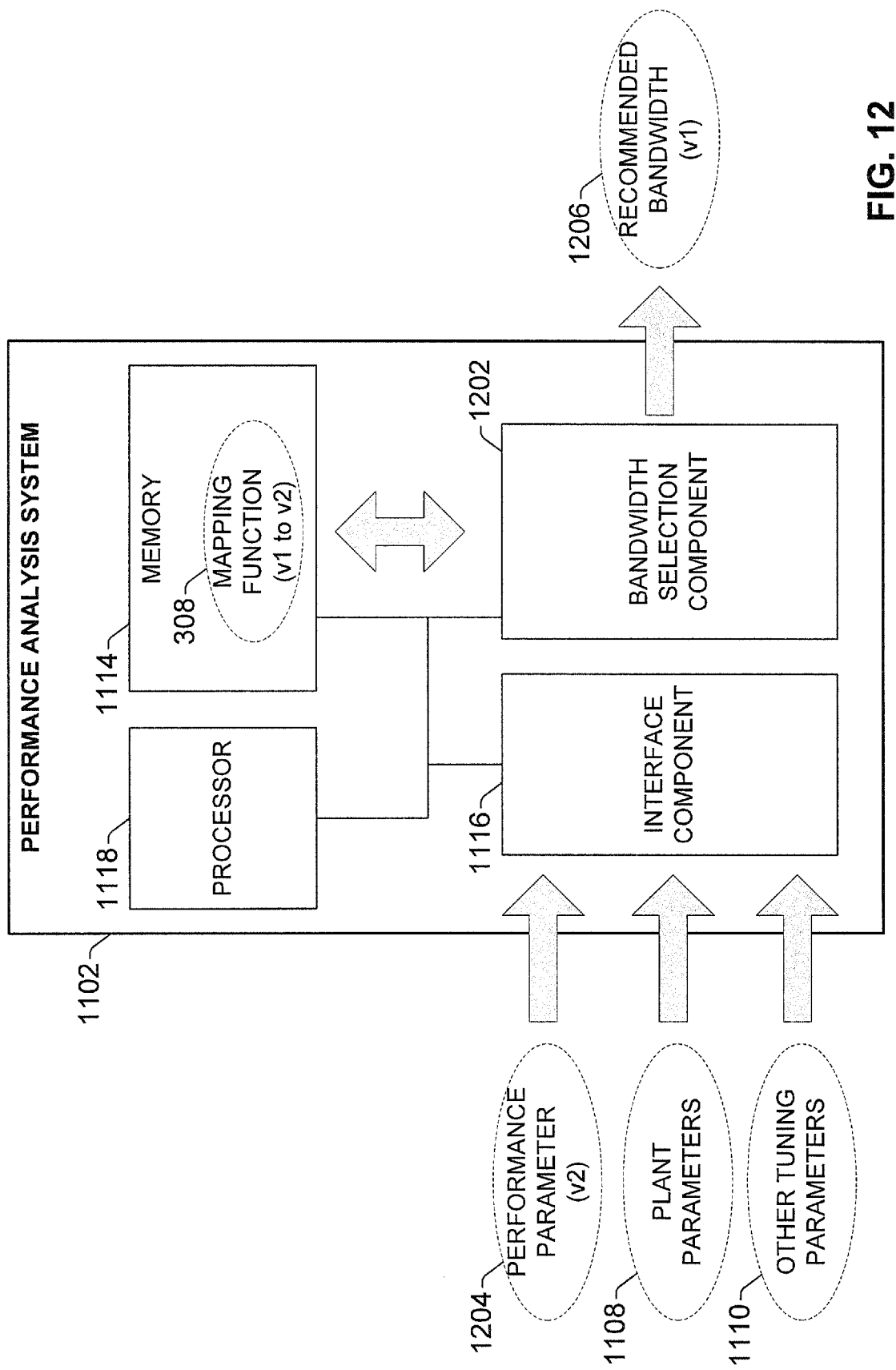
FIG. 12 is a block diagram of an example performance analysis system that leverages a mapping function generated by the curve fitting system to generate recommended tuning parameter values for a motion system.

In another example embodiment, the performance analysis system 1102 can leverage the mapping function data 308 to determine a suitable major tuning parameter value (or range of tuning parameter values) that satisfies a desired performance objective given the plant parameter(s) 1108 and one or more values of the other tuning parameter(s) 1110. FIG. 12 is a block diagram of an example performance analysis system 1102 that leverages mapping function data 308 generated by the curve fitting system 202 to generate recommended tuning parameter values for a motion system. In this example, it is assumed that the motion system being configured is an ADRC system in which the major tuning parameter is the controller bandwidth. However, the curve fitting techniques described herein can be applied to other types of controllers as well. The interface component 1116 prompts the user to enter the values of the other independent variables for the motion system (e.g., plant parameters 1108 and other fixed tuning parameters 1110), as well as the desired value (or range of values) for the performance parameter 1204 represented by variable $v_2$. A bandwidth selection component 1202 can then analyze mapping function data 308 to determine the major tuning parameter (in this case, controller bandwidth) corresponding to the user-provided values 1204, 1108, and 1110, and generate output data 1206 identifying the recommended value of the major tuning parameter (e.g., by rendering the value of the tuning parameter on a user interface display, or outputting the value to another system).

In some embodiments, rather than prompting the user for a single value of the performance parameter 1204, the analysis system 1102 may allow the user to enter a range of acceptable values for the selected performance parameter (that is, a range of values of $v_2$ that define an acceptable performance tolerance). Based on this range, the bandwidth selection component 1202 can identify, based on analysis of the mapping function data 308, a range of values of the major tuning parameter (e.g., bandwidth) that will result in system performance within the user-defined tolerance range.

In some embodiments, rather than prompting the user to enter explicit values for the independent variables, the performance analysis system 1102 can be configured to analyze mapping function data 308 in order to identify one or more sets of values of the independent variables (the major tuning parameter, other tuning parameter(s), and plant variable(s)) that optimize or substantially optimize the performance parameter of interest. For example, if the mapping function data 308 maps from the major tuning parameter ($v_1$) to a maximum deviation ($v_2$) of the motion system, the user may instruct the analysis system 1102 to identify one or more values for the major tuning parameter, other tuning parameters, and plant parameters (that is, one or more combinations of values of the independent variables) that will yield a minimum value for the maximum deviation. The analysis system 1102 can determine these sets of values via analysis of the mapping function data 308; e.g., by determining values of the independent variables that correspond to a minimal value of the maximum deviation $v_2$, or by determining multiple sets of values of the independent variables that correspond to values of the maximum deviation $v_2$ that are below a minimum value specified by the user. The system 1102 can then output the proposed value sets via the user interface. In this way, such embodiments of the performance analysis system 1102 can assist the user with design and configuration of a motion control system by determining and recommending design parameters (e.g., plant parameters, tuning parameters, etc.) that will substantially optimize a selected performance aspect of the motion system (e.g., disturbance settling time, maximum deviation, torque/speed noise ratio, phase margin, inertia variation range, open-loop cross-over frequency), or that will otherwise cause the selected performance aspect to satisfy a user-defined requirement.

It is to be appreciated that the example types of analysis that can be performed using the mapping function data 308 are only intended to be exemplary, and that other types of analysis that leverage the mapping information defined by mapping function data 308 are within the scope of one or more embodiments of this disclosure.

In various embodiments of the performance analysis system 1102 illustrated in FIGS. 11 and 12, one or more of the interface component 116, performance estimation component 1104, bandwidth selection component 1202, one or more processors 1118, and memory 1114 can be electrically and/or communicatively coupled to one another to perform one or more of the functions of the performance analysis system 1102. In some embodiments, components 1116, 1104, and/or 1202 can comprise software instructions stored on memory 1114 and executed by processor(s) 1118. The performance analysis system 1102 may also interact with other hardware and/or software components not depicted in FIGS. 11 and 12. For example, processor(s) 1118 may interact with one or more external user interface device, such as a keyboard, a mouse, a display monitor, a touchscreen, or other such interface devices.

Figure 13:
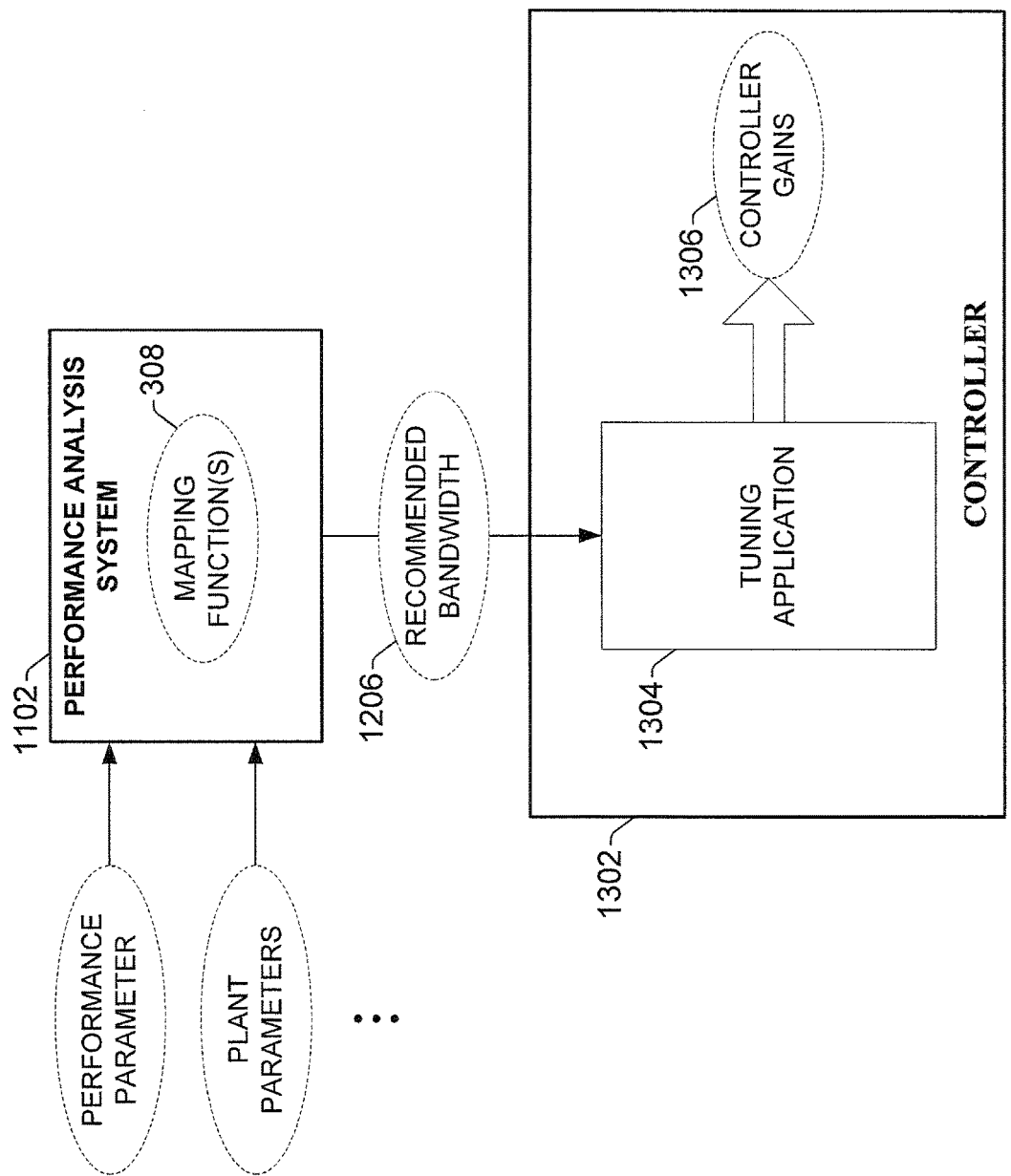
FIG. 13 is a block diagram illustrating an example motion control tuning application that utilizes the recommended bandwidth value determined based on the mapping function.

As noted above, the recommended bandwidth value determined based on analysis of the mapping function data 308 can be exported to separate systems in some embodiments. In some scenarios, the recommended bandwidth value can be exported directly to a controller tuning application to facilitate tuning a motion controller. FIG. 13 is a block diagram illustrating an example motion control tuning application that utilizes the recommended bandwidth value determined based on the mapping function data 308 generated by curve fitting system 202. In this example, a tuning application 1304 is used to tune controller gains for controller 1302, where the controller 1302 controls operation of a motor-driven motion system (not shown). Performance analysis system 1102, using mapping function data 308 generated by the curve fitting system 202, can determine a suitable controller bandwidth value for controller 1302 that satisfies a set of design parameters specified by the user, as described above.

The performance analysis system 1102 can then export the recommended controller bandwidth value (represented by output data 1206) to the tuning application 1304. Alternatively, the performance analysis system 1102 can render the recommended controller bandwidth value represented by output data 1206 on a user interface, allowing a user to manually enter the controller bandwidth value into the tuning application 1304. Tuning application 1304 can then set one or more controller gains 1306 based on the provided controller bandwidth value. In some embodiments, controller 1302 may support ADRC, whereby only a single tuning parameter (e.g., the controller bandwidth, specified by output data 1206) needs to be optimized to facilitate tuning the controller, thereby simplifying the process of tuning of the control loop.

The curve fitting system described herein can learn and generate accurate relationship information between variables of interest that are dependent upon the values of a number of other independent variables, even in scenarios in which a single function or equation describing the relationship cannot be easily obtained. To this end, rather than finding coefficients for a predefined single nonlinear mapping function, the system described herein can apply recursive curve fitting operations on coefficients of previous curve fittings with respect to each independent variable, thereby generating accurate mapping functions from independent variables to a variable of interest. While this technique can be applied in substantially any type of application in which mapping functions between variables of interest are desired, examples described herein have demonstrated the use of these curve fitting techniques within the field of motion control system design. In such applications, the curve fitting technique can be used to accurately characterize the mapping from, for example, a major tuning parameter (e.g., a controller bandwidth in the case of ADRC systems) and a value of a performance variable of the motion system given a number of other independent variables as inputs (e.g., other tuning parameters, plant parameters, etc.).

The data processed and generated by curve fitting system 202 can relate to substantially any type of motion control application, including but not limited to conveyor control systems, industrial robots (e.g., machining or material handling robots), industrial tooling systems, washing machines, conveyors, centrifuges, pumps, motorized hand tools, material handling systems, automotive systems (e.g., traction or propulsion systems of electric vehicles or other automotive systems), HVAC system components (e.g., fans, pumps, etc.), or other such motion control applications.

Figure 14A:
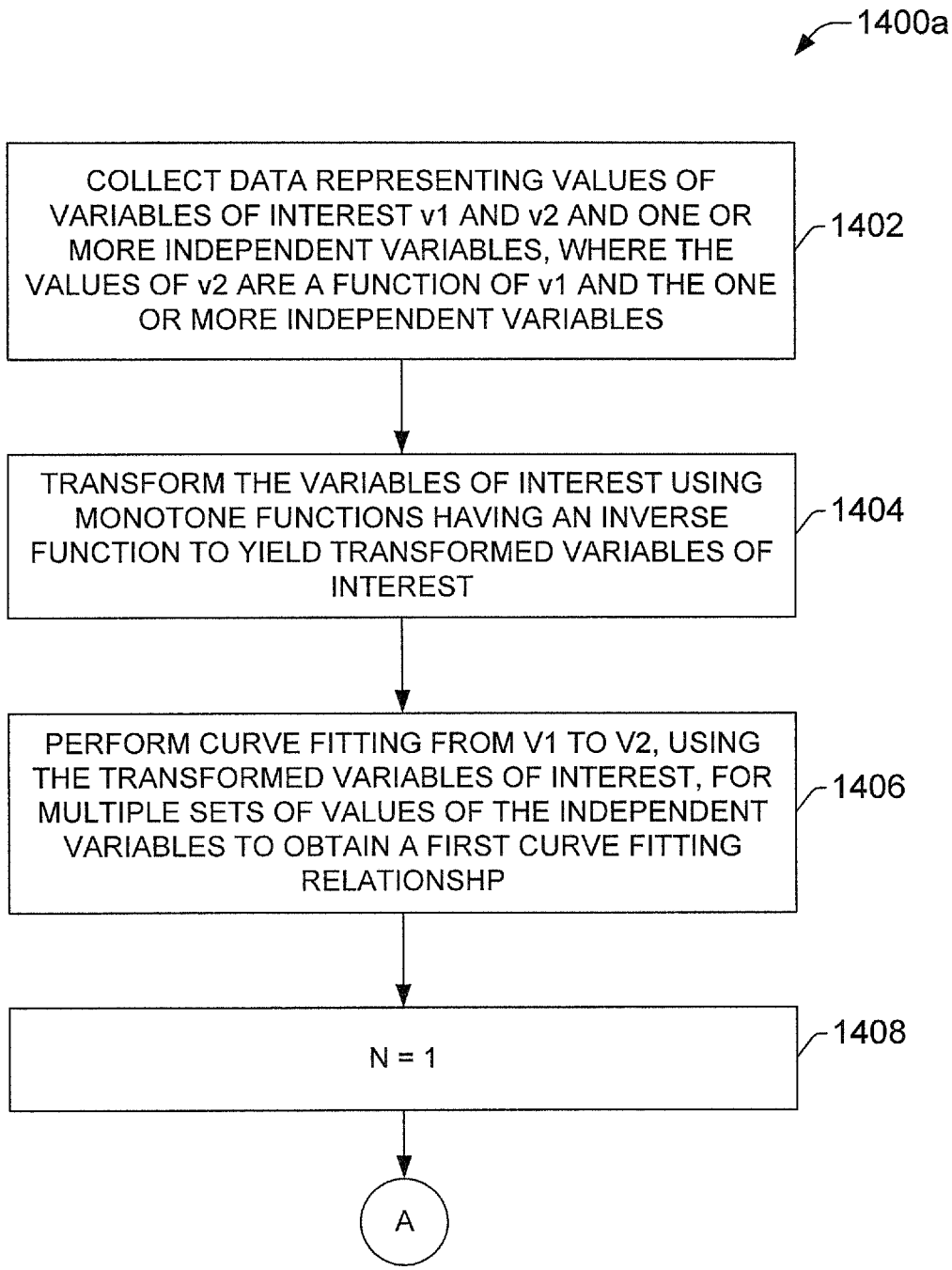
FIGS. 14A and 14B are flowcharts of an example methodology for determining a mapping function that characterizes a mapping between two variables of interest whose values are also dependent upon a number of other independent variables.
Figure 14B:
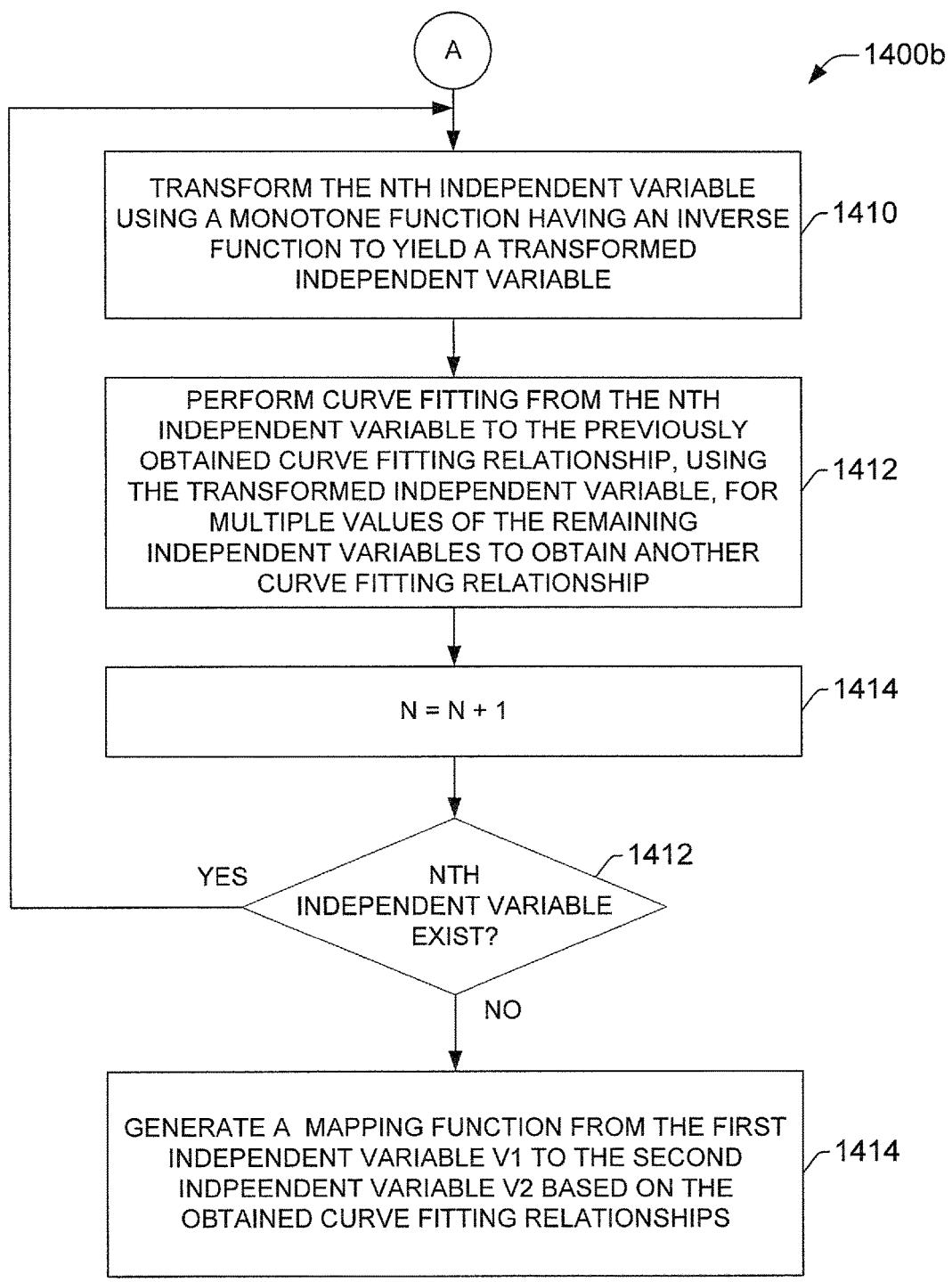

FIGS. 14A-14B illustrate a methodology in accordance with certain disclosed aspects. While, for purposes of simplicity of explanation, the methodology is shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 14A illustrates a first part of an example methodology 1400a for generating a mapping function that characterizes a relationship between two variables of interest that is dependent upon a number of other independent variables. Initially, at 1402, data representing values of two variables of interest $v_1$ and $v_2$ and one or more independent variables are collected, where the values of $v_2$ are a function of $v_1$ and the one or more other independent variables. The data can be obtained via one or more of analytical analysis of a system design (e.g., a motion system), simulation of the system, or measurement of an actual motion system. In an example motion control application, the variables of interest may represent a major tuning parameter and a performance aspect of the motion system, respectively, while the independent variables may represent other tuning parameters, plant parameters, or other variables that have an effect on the values of the variables of interest.

At 1404, the variables of interest are transformed using monotone functions having an inverse function to yield transformed variables of interest. Example monotone functions suitable for this transformation can include, but are not limited to, a logarithmic function ($\log(.)$), an exponential function ($\exp(.)$), an inverse function ($1/x$), a square root function ($\sqrt{(.)}$), or other such monotone functions.

At 1406, curve fitting from $v_1$ to $v_2$ is performed using the transformed variables of interest, where the curve fitting is performed for multiple sets of values of the independent variables. This curve fitting produces a first curve fitting relationship. Substantially any method of curve fitting can be used in step 1406. In an example scenario in which a cubic polynomial fitting is used, the curve fitting relationship may have a form of a polynomial coefficient array or vector for each set of values of the independent variables.

At 1408, an integer value N is set to 1, where the variable N is used to track the number of independent variables for which subsequent curve fittings are performed.

The methodology then proceeds to the second part 1400b illustrated in FIG. 14B. At 1410, the Nth independent variable is transformed using a monotone function having an inverse function to yield a transformed independent variable. At 1412, curve fitting from the Nth independent variable to the previously obtained curve fitting relationship is performed, using the transformed independent variable, for multiple values of the remaining independent variables. This yields another curve fitting relationship.

At 1414, the variable N is incremented (N=N+1). At 1412, a determination is made as to whether an Nth independent variable exists. This decision step determines whether curve fitting relationships have been found for all the independent variables represented by the data collected at step 1402. If an Nth independent variable exists (YES at step 1412), the methodology returns to step 1410, and steps 1410-1414 are repeated for the Nth independent variable. Note that, during this iteration, step 1412 performs curve fitting from the Nth independent variable to the coefficients of the curve fitting relationship that was obtained during the previous execution of step 1412. Steps 1410-1414 are repeated until curve fitting relationship are obtained for all of the independent variables.

If it is determined at step 1412 that an Nth independent variable does not exist (NO at step 1412, signaling that curve fitting relationships have been found for all independent variables), the methodology proceeds to step 1414, where a mapping function from the first independent variable $v_1$ to the second independent variable $v_2$ is generated based on the curve fitting relationships obtained during the previous steps.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the resonance estimation system described herein can be implemented in any computer system or environment having any number of memory or storage units (e.g., memory 216 of FIG. 2 or memory 1114 of FIGS. 11 and 12), and any number of applications and processes occurring across any number of storage units. This includes, but is not limited to, an environment with server computers and client computers deployed in a network environment or a distributed computing environment, having remote or local storage. For example, with reference to FIG. 2, the data set input component 204, function selection component 206, curve fitting component 208, and mapping component 210 can be stored on a single memory 216 associated with a single device, or can be distributed among multiple memories associated with respective multiple devices. Similarly, data set input component 204, function selection component 206, curve fitting component 208, and mapping component 210 can be executed by a single processor 214, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 15:
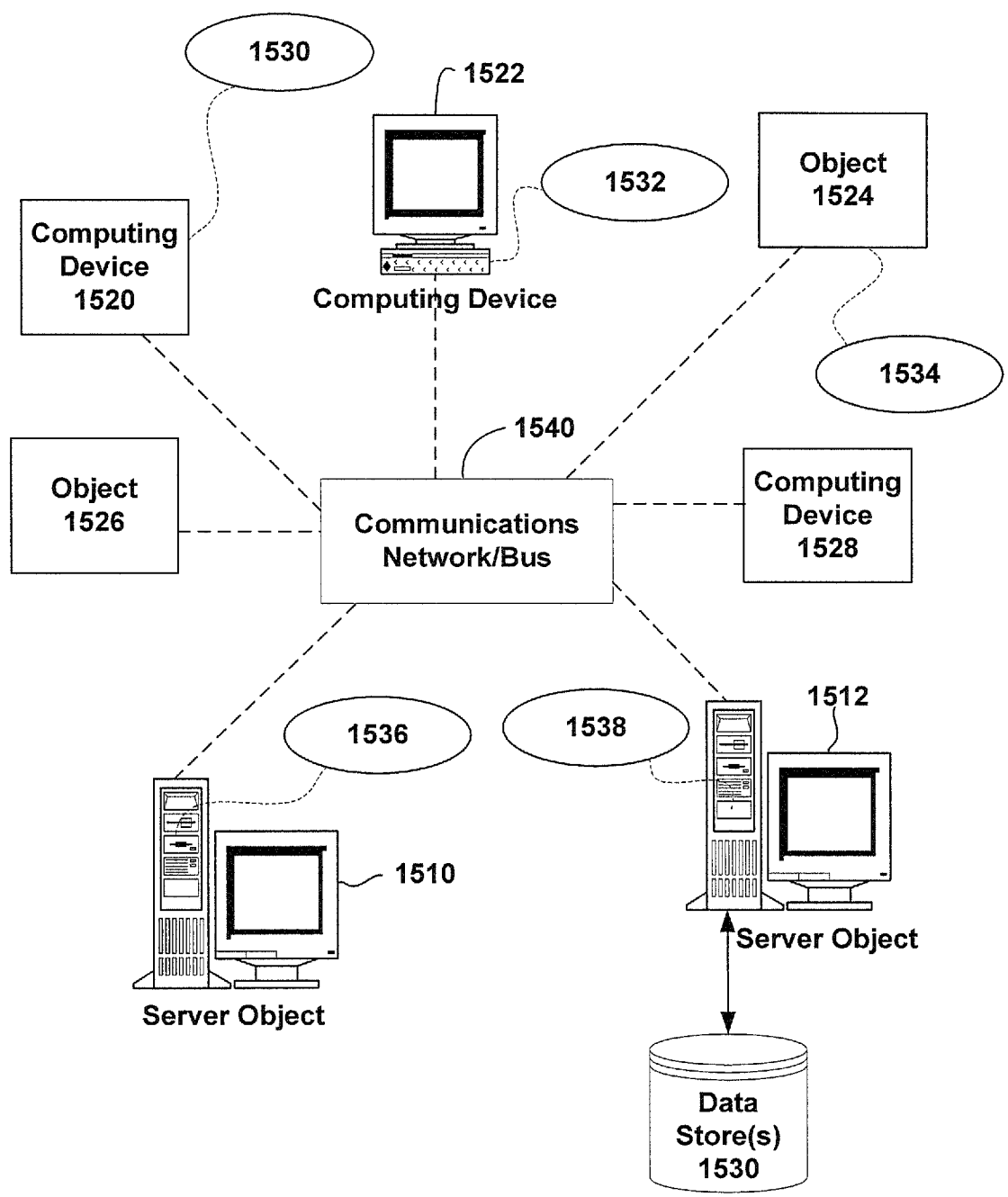
FIG. 15 is a block diagram representing an exemplary networked or distributed computing environment for implementing one or more embodiments described herein.

FIG. 15 provides a schematic diagram of an exemplary networked or distributed computing environment. The distributed computing environment includes computing objects 1510, 1512, etc. and computing objects or devices 1520, 1522, 1524, 1526, 1528, etc., which may include programs, methods, data stores, programmable logic, etc., as represented by applications 1530, 1532, 1534, 1536, 1538. It can be appreciated that computing objects 1510, 1512, etc. and computing objects or devices 1520, 1522, 1524, 1526, 1528, etc. may comprise different devices, such as personal digital assistants (PDAs), audio/video devices, mobile phones, MP3 players, personal computers, laptops, tablets, etc., where embodiments of the inertia estimator described herein may reside on or interact with such devices.

Each computing object 1510, 1512, etc. and computing objects or devices 1520, 1522, 1524, 1526, 1528, etc. can communicate with one or more other computing objects 1510, 1512, etc. and computing objects or devices 1520, 1522, 1524, 1526, 1528, etc. by way of the communications network 1540, either directly or indirectly. Even though illustrated as a single element in FIG. 15, communications network 1540 may comprise other computing objects and computing devices that provide services to the system of FIG. 15, and/or may represent multiple interconnected networks, which are not shown. Each computing object 1510, 1512, etc. or computing objects or devices 1520, 1522, 1524, 1526, 1528, etc. can also contain an application, such as applications 1530, 1532, 1534, 1536, 1538 (e.g., curve fitting system 202 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 15, as a non-limiting example, computing objects or devices 1520, 1522, 1524, 1526, 1528, etc. can be thought of as clients and computing objects 1510, 1512, etc. can be thought of as servers where computing objects 1510, 1512, etc. provide data services, such as receiving data from client computing objects or devices 1520, 1522, 1524, 1526, 1528, etc., storing of data, processing of data, transmitting data to client computing objects or devices 1520, 1522, 1524, 1526, 1528, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1540 is the Internet, for example, the computing objects 1510, 1512, etc. can be Web servers, file servers, media servers, etc. with which the client computing objects or devices 1520, 1522, 1524, 1526, 1528, etc. communicate via any of a number of known protocols, such as the hypertext transfer protocol (HTTP). Computing objects 1510, 1512, etc. may also serve as client computing objects or devices 1520, 1522, 1524, 1526, 1528, etc., as may be characteristic of a distributed computing environment.

Exemplary Computing Device

Figure 16:
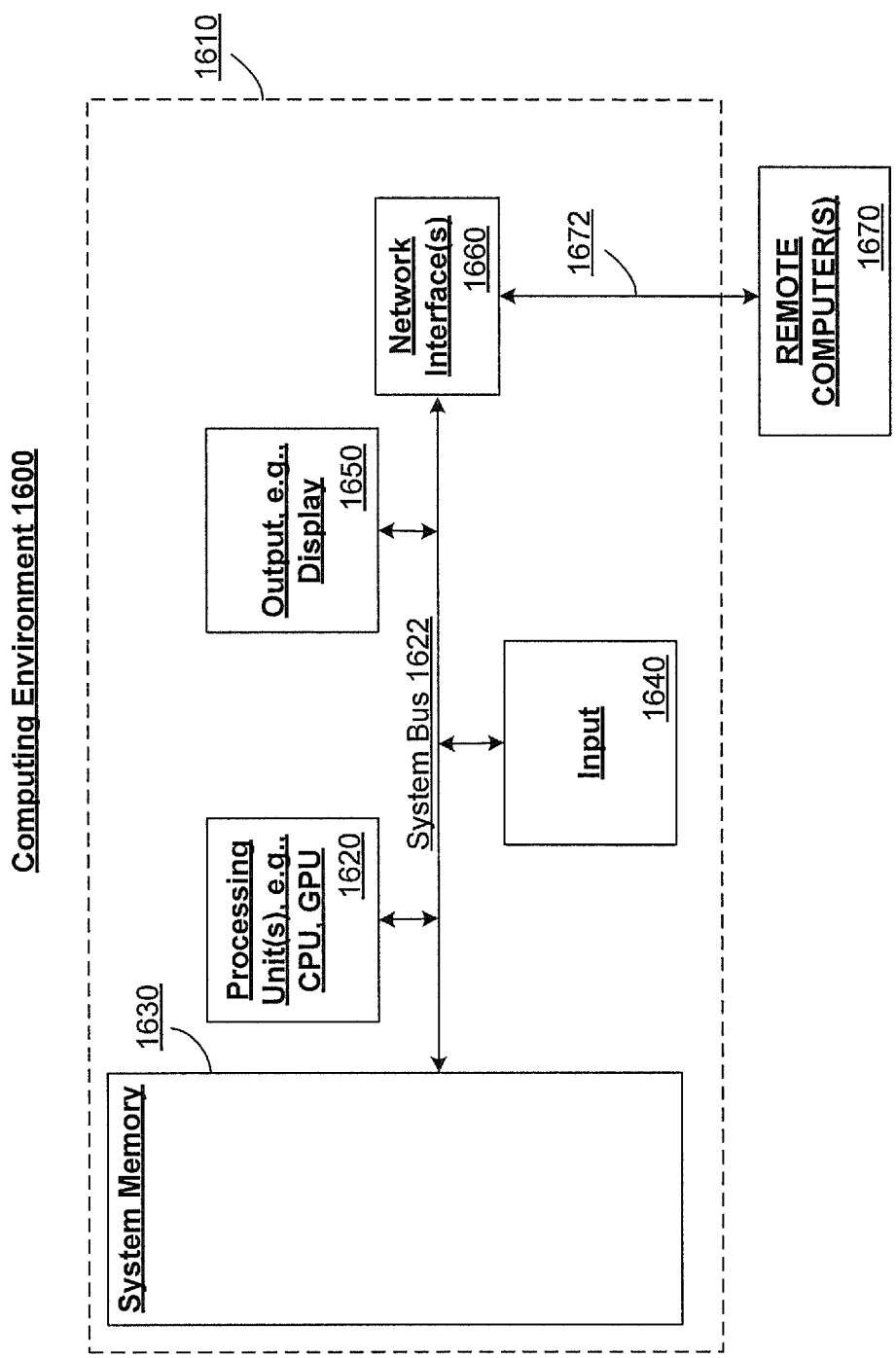
FIG. 16 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 16 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 16 thus illustrates an example of a suitable computing system environment 1600 in which one or aspects of the embodiments described herein can be implemented, although as made clear above, the computing system environment 1600 is only one example of a suitable computing environment and is not intended to suggest any limitation as to scope of use or functionality. Neither is the computing system environment 1600 be interpreted as having any dependency or requirement relating to any one or combination of components illustrated in the exemplary computing system environment 1600.

With reference to FIG. 16, an exemplary computing device for implementing one or more embodiments in the form of a computer 1610 is depicted. Components of computer 1610 may include, but are not limited to, a processing unit 1620, a system memory 1630, and a system bus 1622 that couples various system components including the system memory to the processing unit 1620. Processing unit 1620 may, for example, perform functions associated with processor(s) 214 of curve fitting system 202, while system memory 1630 may perform functions associated with memory 216.

Computer 1610 typically includes a variety of computer readable media and can be any available media that can be accessed by computer 1610. The system memory 1630 may include computer storage media in the form of volatile and/or nonvolatile memory such as read only memory (ROM) and/or random access memory (RAM). By way of example, and not limitation, system memory 1630 may also include an operating system, application programs, other program modules, and program data.

A user can enter commands and information into the computer 1610 through input devices 1640, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1610. A monitor or other type of display device is also connected to the system bus 1622 via an interface, such as output interface 1650. In addition to a monitor, computers can also include other peripheral output devices such as speakers and a printer, which may be connected through output interface 1650. In one or more embodiments, input devices 1640 can provide user input to interface component 212, while output interface 1650 can receive information relating to operations of the curve fitting system 202 from interface component 212.

The computer 1610 may operate in a networked or distributed environment using logical connections to one or more other remote computers, such as remote computer 1670. The remote computer 1670 may be a personal computer, a server, a router, a network PC, a peer device or other common network node, or any other remote media consumption or transmission device, and may include any or all of the elements described above relative to the computer 1610. The logical connections depicted in FIG. 16 include a network 1672, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 216) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the inferences described herein (e.g. in connection with curve fitting operations), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 14A and 14B). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
    a memory;
    a processor configured to execute components stored on the memory, the components comprising:
        a data set input component configured to receive a data set comprising values of a first variable of interest representing a major tuning parameter of a motion controller, values of a second variable of interest representing a performance variable of a motion system controlled by the motion controller, and values of independent variables, wherein
            the values of the second variable of interest depend at least in part on the values of the first variable of interest and the values of the independent variables, and
            at least one of the independent variables represents a plant parameter of the motion system;
        a curve fitting component configured to perform, based on analysis of the data set,
            a first curve fitting from the first variable of interest to the second variable of interest for multiple sets of values of the independent variables to yield first curve fitting relationship data, and
            a second curve fitting from a first independent variable, of the independent variables, to the first curve fitting relationship data for multiple sets of values of a subset of the independent variables that does not include the first independent variable, wherein the second curve fitting yields second curve fitting relationship data;
        a mapping component configured to generate mapping function data that defines a mapping from the first variable of interest to the second variable of interest as a function of the independent variables based at least in part on the first curve fitting relationship data and the second curve fitting relationship data;
        an interface component configured to receive first target values of the independent variables and a second target value of the performance variable; and
        a bandwidth selection component configured to select, based on analysis of the mapping function data, a value of the major tuning parameter corresponding to the first target values and the second target value, and to tune the motion controller using the value of the major tuning parameter.

2. The system of claim 1, wherein
    the curve fitting component is further configured to perform a curve fitting from each independent variable, of the independent variables, to curve fitting relationship data yielded by a previous curve fitting performed for another independent variable of the independent variables to obtain sets of curve fitting relationship data respectively corresponding to the independent variables, and
    the mapping component is further configured to generate the mapping function data further based on the sets of curve fitting relationship data.

3. The system of claim 1, wherein the first curve fitting and the second curve fitting are polynomial curve fittings, and the first curve fitting relationship data and the second curve fitting relationship data comprise polynomial coefficient arrays.

4. The system of claim 1, wherein the curve fitting component is further configured to transform a subset of the data set corresponding to the first variable of interest and a second subset of the data set corresponding to the second variable of interest using a monotone function to yield transformed data, and to perform the first curve fitting on the transformed data.

5. The system of claim 4, wherein the components further comprise a function selection component configured to select or construct the monotone function based on a characteristic of the data set.

6. The system of claim 1, wherein the curve fitting component is further configured to transform a subset of the data set corresponding to the first independent variable using a monotone function to yield transformed data, and to perform the second curve fitting on the transformed data.

7. The system of claim 1, wherein the curve fitting component is further configured to
    segment at least one of a first subset of the data set corresponding to the first variable of interest or a second subset of the data set corresponding to the first independent variable into multiple ranges, and
    perform, as at least one of the first curve fitting or the second curve fitting, respective curve fittings on the multiple ranges.

8. The system of claim 1, wherein at least one of the independent variables represents or another tuning parameter of the motion controller.

9. The system of claim 1, wherein the performance variable is one of a disturbance settling time of the motion system, a maximum deviation of the motion system from a target speed or position, a torque/speed noise ratio of the motion system, a phase margin of the motion system, inertia variation range of the motion system, or an open-loop cross-over frequency of the motion system.

10. The system of claim 1, further comprising a performance estimation component configured to determine, based on analysis of the mapping function data, a value of the performance variable corresponding to specified values of the major tuning parameter and the independent variables, and to output the value of the performance variable.

11. The system of claim 1, wherein the major tuning parameter is a bandwidth of the motion controller.

12. The system of claim 1, wherein the motion controller controls at least one of a conveyor, an industrial robot, an industrial tooling system, a washing machine, a centrifuge, a pump, a material handling system, a propulsion system of an electric vehicle, or a heating, ventilation, and air conditioning (HVAC) system.

13. A method, comprising:
    receiving, by a system comprising one or more processors, a data set comprising values of a first variable of interest representing a major tuning parameter of a motion controller, values of a second variable of interest representing a performance variable of a motion system controlled by the motion controller, and independent variables, wherein the values of the second variable of interest depend at least in part on the values of the first variable of interest and the values of the independent variables, and at least one of the independent variables represents a plant parameter of the motion system;

performing, by the system, a curve fitting from the first variable of interest to the second variable of interest to yield first curve fitting relationship data for the first variable of interest;

performing, by the system, another curve fitting from an independent variable, of the independent variables, to the first curve fitting relationship data for multiple sets of values of a subset of the independent variables other than the independent variable to yield second curve fitting relationship data for the independent variable;

generating, by the system based on the first curve fitting relationship data and the second curve fitting relationship data, mapping function data that defines a mapping from the first variable of interest to the second variable of interest as a function of the independent variables;

receiving, by the system, first target values of the independent variables and a second target value of the performance variable;

selecting, by the system based on analysis of the mapping function data, a value of the major tuning parameter corresponding to the first target values and the second target value; and tuning, by the system, the motion controller in accordance with the value of the major tuning parameter.

14. The method of claim 13, further comprising:

in response to determining that curve fitting relationship data has not been generated for another independent variable of the independent variables, performing another curve fitting from the other independent variable to curve fitting relationship data that was obtained via a curve fitting performed immediately prior to the other curve fitting, wherein the performing the other curve fitting comprises performing the other curve fitting for multiple sets of values of another subset of the independent variables other than the other independent variable and independent variables for which curve fitting relationship data has been generated, and wherein the other curve fitting yields other curve fitting relationship data for the other independent variable.

15. The method of claim 14, wherein the generating the mapping function data comprises generating the mapping function data further based on the other curve fitting relationship data.

16. The method of claim 13, wherein the first curve fitting relationship data and the second curve fitting relationship data comprise polynomial coefficient arrays.

17. The method of claim 13, further comprising:

transforming a first subset of the data set corresponding to the first variable of interest and a second subset of the data set corresponding to the second variable of interest using a monotone function to yield transformed data, and performing the first curve fitting on the transformed data.

18. The method of claim 13, wherein the performing the second curve fitting comprises:

segregating at least one of a first subset of the data set corresponding to the first variable of interest or a second subset of the data set corresponding to the first independent variable into multiple ranges, and performing, as at least one of the first curve fitting or the second curve fitting, respective curve fittings on the multiple ranges.

19. A non-transitory computer-readable medium having stored thereon executable components that, in response to execution by a system comprising a processor, cause the system to perform operations, the operations comprising:

receiving a data set comprising values of a first variable of interest representing a major tuning parameter of a motion controller, values of a second variable of interest representing a performance variable of a motion system controlled by the motion controller, and independent variables, wherein the values of the second variable of interest depend at least in part on the values of the first variable of interest and the values of the independent variables, and at least one of the independent variables represents a plant parameter of the motion system;

performing a curve fitting from the first variable of interest to the second variable of interest to yield first curve fitting relationship data;

performing a second curve fitting from an independent variable, of the independent variables, to the first curve fitting relationship data for multiple sets of values of a subset of the independent variables other than the independent variable to yield second curve fitting relationship data for the independent variable;

generating, based on the first curve fitting relationship data and the second curve fitting relationship data, mapping function data that defines a mapping from the first variable of interest to the second variable of interest;

receiving first target values of the independent variables and a second target value of the performance variable;

selecting, based on analysis of the mapping function data, a value of the major tuning parameter corresponding to the first target values and the second target value; and tuning the motion controller in accordance with the value of the major tuning parameter.

20. The non-transitory computer-readable medium of claim 19, wherein the operations further comprise:

performing curve fitting from each independent variable, of the independent variables, to curve fitting relationship data yielded by a previous curve fitting performed for another independent variable of the independent variables to obtain respective sets of curve fitting relationship data corresponding to the independent variables, and wherein the generating comprises generating the mapping function data further based on the sets of curve fitting relationship data.

* * * * *